(12) United States Patent
Heidingsfeld et al.

(10) Patent No.: US 8,825,994 B2
(45) Date of Patent: *Sep. 2, 2014

(54) ATOMIC SWITCHING OF IMAGES IN DESKTOP STREAMING OVER WIDE AREA NETWORKS

(71) Applicant: VMware, Inc., Palo Alto, CA (US)

(72) Inventors: Eytan Heidingsfeld, South Netanya (IL); Yehuda Itzhakov, South Netanya (IL); Tai Zamir, South Netanya (IL)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/627,456

(22) Filed: Sep. 26, 2012

(65) Prior Publication Data

US 2013/0024680 A1  Jan. 24, 2013

Related U.S. Application Data

(63) Continuation of application No. 12/723,531, filed on Mar. 12, 2010, now Pat. No. 8,301,874.

(60) Provisional application No. 61/253,419, filed on Oct. 20, 2009.

(51) Int. Cl.
*G06F 9/44* (2006.01)
*G06F 9/24* (2006.01)
*G06F 9/445* (2006.01)
*G06F 15/177* (2006.01)
*G06F 1/24* (2006.01)
*G06F 17/30* (2006.01)

(52) U.S. Cl.
CPC ................ *G06F 17/30168* (2013.01)
USPC .................................. 713/2; 713/1; 713/100

(58) Field of Classification Search
CPC ....... G06F 1/24; G06F 9/4401; G06F 9/4406; G06F 9/4408; G06F 9/441; G06F 9/4416; G06F 9/445; G06F 9/46; G06F 11/1417
USPC ................................................. 713/1, 2, 100
See application file for complete search history.

(56) References Cited

U.S. PATENT DOCUMENTS 6,317,826 B1  11/2001  McCall et al.
6,389,433 B1   5/2002  Bolosky et al.
(Continued)

OTHER PUBLICATIONS

Yang et al., "FBBM: A new Backup Method with Data De-duplication Capability", Dated Apr. 2008, International Conference on Multimedia and Ubiquitous Engineering, 5 pages, IEEE Digital Library.

(Continued)

*Primary Examiner* — Tanh Nguyen

(57) ABSTRACT

A method for replacing a current desktop image having a current operating system on storage media for a computing device is described. In the method, an agent process is executed on the computing device for downloading from a server to a staging area on local storage media a replacement desktop disk image having a replacement operating system. The replacement desktop image includes a prefetch set of files and metadata for additional files, the prefetch set of files including a minimal set of files necessary to boot the replacement operating system, the replacement desktop image not including contents of the additional files. The computing device is rebooted to replace the current desktop image with the replacement desktop image. The computing device is then rebooted again to load the replacement operating system using the prefetch set of files.

20 Claims, 7 Drawing Sheets

(56) References Cited

U.S. PATENT DOCUMENTS

| | | | |
|---|---|---|---|
| 6,477,544 B1 | 11/2002 | Bolosky et al. | |
| 6,810,478 B1 | 10/2004 | Anand et al. | |
| 6,925,533 B2 | 8/2005 | Lewis | |
| 7,047,482 B1 | 5/2006 | Odom | |
| 7,080,051 B1 | 7/2006 | Crawford | |
| 7,567,188 B1 | 7/2009 | Anglin et al. | |
| 7,716,307 B1 | 5/2010 | Ben-Shaul et al. | |
| 7,734,820 B1 | 6/2010 | Ranade et al. | |
| 7,814,148 B2 | 10/2010 | Bell et al. | |
| 7,814,149 B1 | 10/2010 | Stringham | |
| 7,953,833 B2* | 5/2011 | Ben-Shaul et al. | 709/222 |
| 8,234,359 B2* | 7/2012 | Bestmann | 709/222 |
| 8,239,662 B1* | 8/2012 | Nelson | 713/1 |
| 8,239,667 B2* | 8/2012 | Durham | 713/100 |
| 8,250,352 B2* | 8/2012 | Filali-Abid et al. | 713/1 |
| 8,301,874 B1* | 10/2012 | Heidingsfeld et al. | 713/2 |
| 8,316,123 B2* | 11/2012 | Sethuraman et al. | 709/224 |
| 8,352,624 B2 | 1/2013 | Zimmerman et al. | |
| 2002/0010798 A1 | 1/2002 | Ben-Shaul et al. | |
| 2003/0126242 A1 | 7/2003 | Chang | |
| 2003/0131225 A1 | 7/2003 | Bradley | |
| 2003/0182436 A1 | 9/2003 | Henry | |
| 2006/0282457 A1 | 12/2006 | Williams et al. | |
| 2007/0214348 A1 | 9/2007 | Danielsen | |
| 2007/0260868 A1 | 11/2007 | Azzarello et al. | |
| 2008/0184336 A1 | 7/2008 | Sarukkai et al. | |
| 2008/0243957 A1 | 10/2008 | Prahlad et al. | |
| 2008/0281884 A1 | 11/2008 | Subrahmanyam et al. | |
| 2009/0106255 A1 | 4/2009 | Lacapra et al. | |
| 2009/0142055 A1 | 6/2009 | Qiu et al. | |
| 2009/0198805 A1 | 8/2009 | Ben-Shaul et al. | |
| 2009/0234892 A1 | 9/2009 | Anglin et al. | |
| 2009/0271454 A1 | 10/2009 | Anglin et al. | |
| 2010/0023995 A1 | 1/2010 | Kim | |
| 2010/0042626 A1 | 2/2010 | Verma et al. | |
| 2010/0070478 A1 | 3/2010 | Anglin | |
| 2010/0094817 A1 | 4/2010 | Ben-Shaul et al. | |

OTHER PUBLICATIONS

Yuezhi Zhou, et al., "Virtual disk based centralized management for enterprise networks" Pisa, Italy 2006, pp. 23-28.

Tolia, N. et al., "Opportunistic Use of Content Addressable Storage for Distributed File Systems", Proceedings of the USENIX Annual Technical Conference, pp. 127-140, Jun. 9, 2003, San Antonio, TX, XP 009068169.

Muthitacharoen, A. et al., "A Low-bandwidth Network File System", ACM SOSP, Proceedings of the 18th ACM Symposium on Operating Systems Principles, pp. 174-187, Oct. 21, 2002, Baniff, Alberta, Canada, XP 002405303.

KyoungSoo, P. et al., "Supporting Practical Content-Addressable Caching with CZIP Compression", 2007 USENIX Annual Technical Conference, pp. 185-198, Oct. 21, 2002, Berkeley, CA, XP 002568537.

International Search Report for PCT/US2009/060554, dated Feb. 23, 2010, 4 pages.

Written Opinion of International Searching Authority for PCT/US2009/060554, dated Feb. 23, 2010, 10 pages.

Current claims from PCT/US2009/060554, International Filing Date, Oct. 13, 2009, pp. 39-46.

* cited by examiner

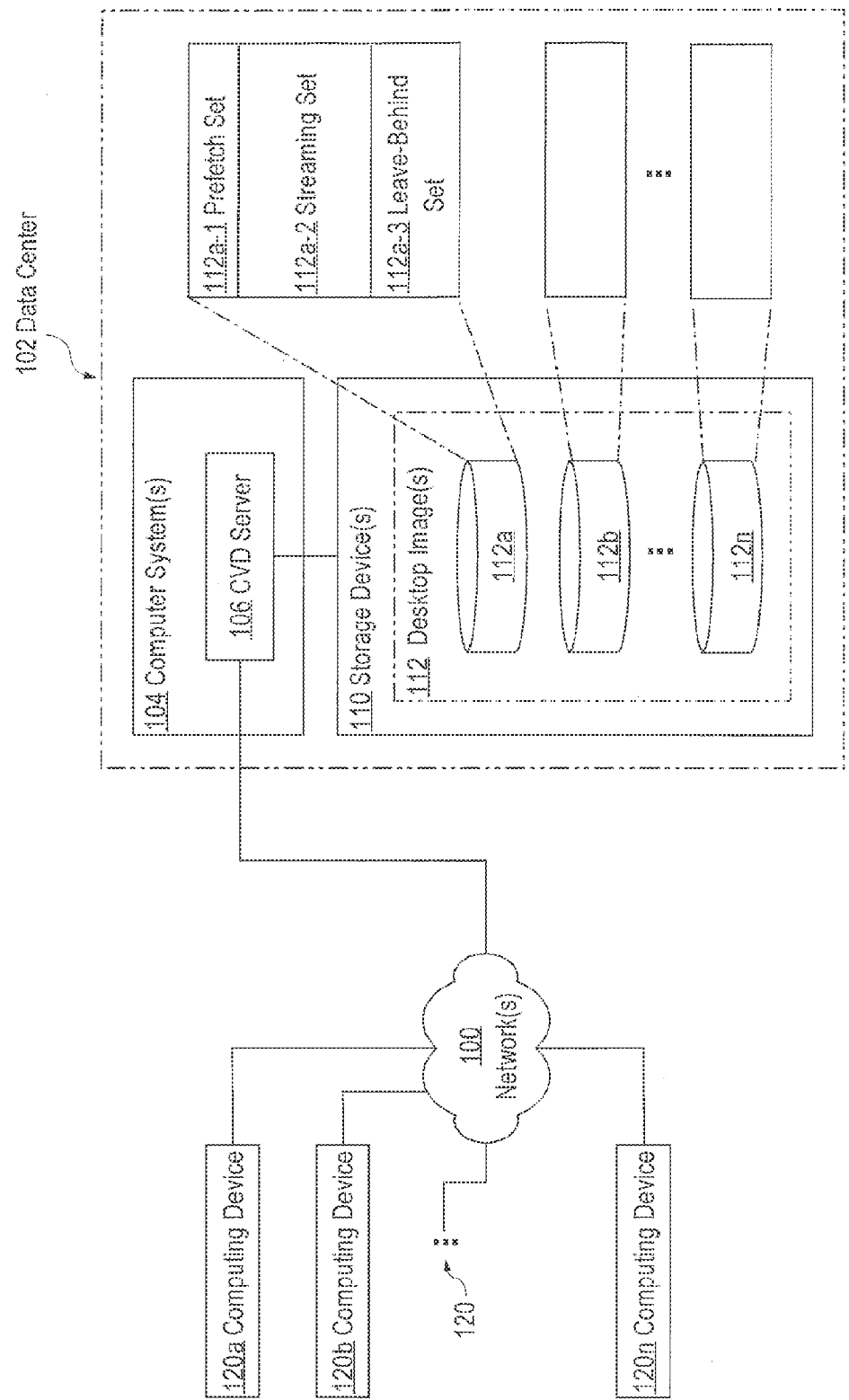

ATOMIC SWITCHING OF IMAGES IN DESKTOP STREAMING OVER WIDE AREA NETWORKS

PRIORITY CLAIM; RELATED APPLICATIONS

This application is a continuation of U.S. patent application Ser. No. 12/723,531, filed Mar. 12, 2010, which has the same title as the present application and which claims priority and benefit under 35 U.S.C. §119(e) to U.S. Provisional Patent Application Ser. No. 61/253,419, filed by Israel Ben-Shaul et al. on Oct. 20, 2009 and titled "DESKTOP STREAMING OVER WIDE AREA NETWORKS", the entire content of which are hereby incorporated by reference as if fully set forth herein.

This application is related to U.S. patent application Ser. No. 12/723,572, filed by Israel Ben-Shaul et al. on Mar. 12, 2010 and titled "Desktop Streaming over Wide Area Networks", the entire content of which is hereby incorporated by reference as if fully set forth herein.

This application is related to U.S. patent application Ser. No. 12/723,550, filed by Israel Ben-Shaul et al. on Mar. 12, 2010 and titled "On-Demand Block-level File System Streaming to Remote Desktops", the entire content of which is hereby incorporated by reference as if fully set forth herein.

This application is related to U.S. patent application Ser. No. 12/270,715, filed by Israel Ben-Shaul et al. on Nov. 13, 2008 and titled "Desktop Delivery For A Distributed Enterprise", the entire content of which is hereby incorporated by reference as if fully set forth herein.

This application is related to U.S. patent application Ser. No. 12/578,485, filed by Israel Ben-Shaul et al. on Oct. 13, 2009 and titled "Storage-Network De-Duplication", the entire content of which is hereby incorporated by reference as if fully set forth herein.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Enterprise desktop management generally refers to managing, protecting, and distributing the disk contents of a large number of computers in an enterprise such as, for example, a company, an educational institution, or a government or non-government organization. Enterprise desktop management is one of the most challenging Information Technology (IT) tasks for several reasons.

One reason is the complexity of managing a large number of different desktop instances that may exist on enterprise computers. The sheer number of computers to manage, the proliferation of operating system (OS) images and applications, and the complex set of operations to apply—including, but not limited to, deployment and provisioning, patching, upgrades, application installations and management, compliance testing, troubleshooting and re-imaging—all make the managing of enterprise computers a very challenging task. This task is further complicated because typically the execution of end user workloads and applications is delegated to the endpoint enterprise computers for the purposes of cost-effectiveness, improving performance and the end user experience, and providing the end users with the ability to work offline.

Another reason that makes enterprise desktop management a challenging task is that nowadays most enterprises are dispersed over multiple geographic locations. The use of Local Area Networks (LANs) that are connected over one or more Wide Area Networks (WANs) with variable bandwidths and latencies is a serious barrier to providing efficient desktop management without sacrificing the end user experience. For example, various desktop management operations (e.g., deployment and provisioning, patching, upgrades, application installations, etc.) typically need to be performed on end user computers over low bandwidth and high latency networks, while the end users justifiably expect to be able to start working on their computers without significant delays and without having to wait for long-running management operations to complete.

BRIEF DESCRIPTION OF THE DRAWINGS

In the figures of the accompanying drawings like reference numerals refer to similar elements.

FIG. 1A is a block diagram that illustrates example server-side components for desktop streaming in one operational context.

DETAILED DESCRIPTION

Figure 1B:
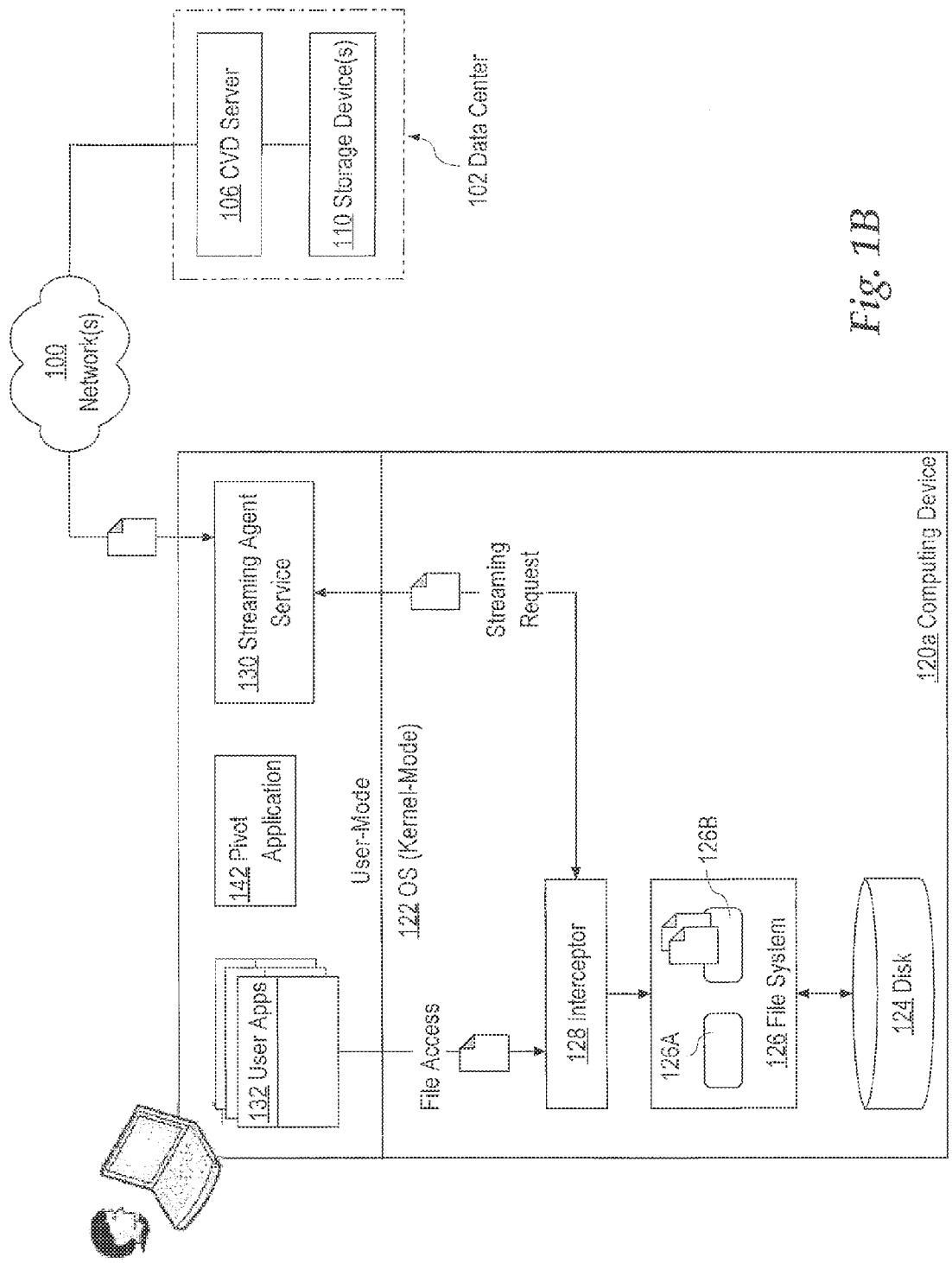
FIG. 1B is a block diagram that illustrates example endpoint-side components for desktop streaming according to the operational context illustrated in FIG. 1A.

Techniques are provided for desktop streaming over wide area networks. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 Overview

The techniques described in the present disclosure provide for streaming desktop images from a centralized location (e.g., such as a data center) to a computing device over one or more networks.

As used herein, "desktop image" (or just "image") refers to data and executables that comprise substantially the entire content that is stored at a computing device, including the operating system (OS), applications, configuration and settings, as well as all user data and files. For example, in some embodiments, a desktop image includes all files that are stored on one or more physical storage devices (e.g., such as hard disks or solid state storage devices) in a computing device. In other embodiments a desktop image includes all files that are stored on one or more physical storage devices in a computing device, except files that are temporary or transient in nature and that do not need to be centrally managed. It is noted that the target computing device (also referred to as "endpoint" or "endpoint device") can be a virtual or a physical machine and can have limited physical storage space that may be smaller than the size of the entire desktop image that is centrally maintained for that computing device.

According to the techniques described herein, a desktop image includes a collection of files that store data in compressed or non-compressed form, and the data may be unformatted (e.g., binary data, raw disk blocks, raw data partitions, etc.) or structured as various types of files (e.g., data files, DLL files, executable files, personal user files of various file types, various types of configuration files, etc.) and/or any other type of data structure format. The collection of files included in a desktop image is sometimes referred to hereinafter as a Centralized Virtual Desktop (CVD). The set of one or more desktop images, which are maintained centrally for a particular computing device, is sometimes referred to hereinafter as a Personal Virtual Disk (PVD).

As used herein, "streaming" a desktop image refers to transferring or otherwise transmitting the desktop image files in a sequence over one or more networks. In accordance with the techniques described herein, the sequence in which the files in a desktop image are streamed to a computing device is determined specifically for that particular computing device. This allows for streamlining the centralized management of desktop images for a large number of computing devices while at the same time enabling each individual computing device to start operating as quickly as possible by transferring over the network only the minimal amount of data that is necessary for that individual computing device to start operation.

1.1 Use Cases for Desktop Streaming

In a distributed system that centralizes the management of desktop images in a data center but executes the desktop images in remote endpoint devices, there is a need to provide a mechanism for fast downloading of a desktop image, or any software updates to that image, onto the remote endpoint device that is associated with that image. Use cases for downloading a desktop image onto a corresponding endpoint device include but are not limited to:

Disaster recovery. The desktop image on the endpoint device has been lost, stolen, or broken and the user of the device lost all data and customizations, including applications that resided on the device. The user wants to resume, as soon as possible, her complete working environment on a new hardware, or replace an old hard disk with a new one.

Software crash. A user has software corruption and needs a copy of his last known working image to be downloaded to the endpoint device operated by the user.

Troubleshooting. The desktop image on the endpoint device is malfunctioning. The IT support person, who is managing a data center that is remote from the endpoint device, can stream the relevant parts of the desktop image onto a local workbench device and troubleshoot the desktop image locally in the data center, while the end user might be offline and continue to work. When the IT person fixes the problem, she streams the fixed desktop image back to the remote endpoint device operated by the user. Hence, the desktop image in this use case may be transferred twice over the network.

Thin-client access to central image. A user does not have his computing device (e.g., laptop) with her, but still wants to access her centralized desktop image using thin-client mechanisms. In this use case, the desktop image can be downloaded, or reassigned, onto a local endpoint (possibly a virtual machine) at the data center and the user can be granted access to the local endpoint using a remote desktop protocol.

Desktop roaming. A user wants to access his single logical desktop image from multiple physical endpoints (e.g., a desktop computer and a laptop). On every transition, the user needs the logical desktop image to get downloaded to the endpoint device that the user is currently using.

1.2 Desktop Streaming Overview

In an example operational context, the techniques described herein provide for streaming desktop contents onto an endpoint device over a wide area network, so as to enable the endpoint device to get a desktop image quickly in order to start its operation without having to wait for the entire image to get downloaded and by requiring minimal amount of data on the endpoint device before it can start its operation.

According to the techniques described herein, in one embodiment a computer comprises one or more processors and logic that is stored in one or more storage media and is executable by the one or more processors. When executed, the logic receives, over a network, a first request for a desktop image of a computing device, where the desktop image includes a collection of files for the computing device. The logic segments the desktop image into a prefetch set, a streaming set, and a leave-behind set. The prefetch set includes a smallest subset of files, in the collection of files, that is needed to boot up the computing device without requiring retrieval of additional files over the network. The streaming set includes those files, in the collection of files, that are to be downloaded to the computing device after the computing device has booted up. The leave-behind set includes those files, in the collection of files, that are to be downloaded to the computing device when specifically requested. In response to the first request, the logic sends the prefetch set to the computing device which causes the computing device to boot up from files in the prefetch set. After the prefetch set has been sent, the logic receives a second request for the streaming set and in response thereto sends the streaming set to the computing device.

According to the techniques for desktop streaming described herein, in one embodiment a computing device comprises one or more processors, one or more storage media coupled to the one or more processors, and logic that is stored in the one or more storage media and is executable by the one or more processors. When executed, the logic sends, over a network, a first request for a desktop image of the computing device, where the desktop image includes a collection of files for the computing device and where the desktop image is segmented into a prefetch set, a streaming set, and a leave-behind set. In response to the first request, the logic receives the prefetch set and boots up the computing device from files in the prefetch set. After the computing device has booted up, the logic sends a second request for the streaming set and in response thereto commences receiving the streaming set.

According to the techniques for desktop streaming described herein, in one embodiment a computer comprises one or more processors and logic that is stored in one or more storage media and is executable by the one or more processors. When executed, the logic receives, over a network, a first request for a desktop image of a computing device, where the desktop image includes a collection of files for the computing device. The logic determines that a first hardware indicated in the desktop image is not compatible with a second hardware of the computing device that is indicated in the first request. The logic generates a rebased desktop image by modifying the desktop image, where the rebased desktop image includes a modified collection of files that matches the second hardware of the computing device. The logic segments the rebased desktop image into a prefetch set, a streaming set, and a leave-behind set by assigning each file of the modified collection of files to one of the prefetch set, the streaming set, and the leave-behind set. In response to the first request, the logic sends the prefetch set to the computing device which causes the computing device to boot up from files in the prefetch set. After the prefetch set has been sent, the logic receives a second request for the streaming set and in response thereto sends the streaming set to the computing device.

According to the techniques for desktop streaming described herein, in one embodiment a computing device comprises one or more processors, one or more storage media coupled to the one or more processors, and interceptor logic that is stored in the one or more storage media and is executable by the one or more processors. The interceptor logic is configured to execute in the kernel of the operating system (OS) on the computing device. When executed, the interceptor logic receives, from a first process executing on the computing device, a first request to open a file in a file system that is supported by the OS, where the first request to open the file specifies a first sharing mode that precludes other processes executing on the computing device from opening the file. In the file system, at least one block from the file has not yet been downloaded to the computing device over a network. In response to the first request, the interceptor logic modifies the first sharing mode to a read-write sharing mode that allows other processes to open the file for reading and writing. The interceptor logic receives, over the network, one or more blocks from the file and writes the one or more blocks into the file. While the one or more blocks are being received or written into the file, the interceptor logic receives a second request to open the file from a second process executing on the computing device, where the second request specifies a second sharing mode. The interceptor logic checks the second sharing mode for compatibility with the first sharing mode, and denies the second request to open the file when the second sharing mode is not compatible with the first sharing mode even though in the file system the file is opened in the read-write sharing mode.

According to the techniques for desktop streaming described herein, in one embodiment a computing device comprises one or more processors, one or more storage media coupled to the one or more processors, and pivot logic that is stored in the one or more storage media and is executable by the one or more processors. The pivot logic is configured to execute during a first boot of the operating system (OS) on the computing device as a pivot process, where the pivot process is the only process running when it performs modifications in a file system on the computing device. During execution, the pivot process causes the one or more processors to replace a current set of files in the file system with a new desktop image, where the new desktop image presents a complete view of the file system. The new desktop image includes a prefetch set of files, where the prefetch set of files includes a smallest subset of files that is needed to boot the computing device without requiring retrieval of additional files over a network. Files other than the files in the prefetch set are represented in the complete view of the file system only by file metadata that is included in the desktop image. After replacing the current files in the file system with the new desktop image, the pivot process terminates the first boot and invokes a second boot that is executed based on the prefetch set of files included in the new desktop image.

In other embodiments, the techniques for desktop streaming provide one or more methods for performing the functionalities described herein, and one or more computer-readable storage media that stores the logic for performing these functionalities in the form of executable program instructions.

2.0 Challenges in Implementing Desktop Streaming Over a WAN

The implementation of fast desktop streaming over wide area networks is a challenging task. Specifically, fast downloading of a desktop image to a remote endpoint device over a wide area network presents several technological challenges.

Image size, limited network bandwidth, and limited time to download. A typical desktop image, which includes both system and user files, is typically in the range of 10-50 GB in size. A typical network link connecting an endpoint device to a data center typically has a bandwidth of 1.5 Mbps (e.g., a T1 link) and latency of 60-120 ms roundtrip delay. Even if it is assumed that downloading the desktop image fully utilizes the T1 link (which is rarely the case since the link is also used for other purposes), downloading even 20 GB over a T1 link would take roughly 28 hours to complete. What the techniques described herein achieve is to cut the time users have to wait before they resume their work by two orders of magnitude, that is, they enable users to resume their work within minutes instead of hours or days.

Complete operating system (OS) contents. Unlike streaming of user-mode applications or regular user data, desktop streaming involves sensitive elements that are responsible for the actual operation of an endpoint device itself, including the OS kernel, drivers, security products, and elements that need to run the streaming logic itself at the receiving endpoint device.

Offline operation. Dependence on constant network connectivity cannot be assumed, required, or relied upon when it comes to desktop streaming. For example, in a typical operational context the techniques described herein are used for remote and mobile users who typically use laptops as their endpoint devices and need to be able to work offline. To address this, the techniques described herein enable the end users to work offline after the restore operation of a new desktop image on an endpoint device has completed.

User experience. One goal of the techniques described herein is to ensure that the user experience is such that once the endpoint device is executing the newly downloaded image, the performance from the user perspective should be near-native and not sluggish (e.g., due to network delays or latency, etc.).

Bare metal. The techniques described herein do not require or assume that an endpoint device will run as a virtual machine that is hosted by another remote physical machine. This implies that the desktop streaming mechanism needs to be able to install the desktop image on the hardware of the endpoint that initiated the restore/download process. In particular, the desktop streaming mechanism should be able to perform an atomic switch of images, in which the newly downloaded image replaces whatever image was resident and initiated the download process. Alternatively, if the endpoint device image does not exist or cannot perform the download task, the desktop streaming mechanism provides means to boot the endpoint device over the network and apply the downloaded image onto the native hardware.

Heterogeneous hardware. The new target hardware, onto which a desktop image is to be downloaded, may be different than the previous hardware in which the desktop image was executed. Therefore, the desktop image needs to rebased into a new image that is capable of installing properly on a different hardware.

Limited disk space. In some cases, an endpoint device (e.g., such as a Netbook) may have a small disk but it may be desirable or necessary to enable such endpoint device to operate with a logical disk that is bigger than the physical disk at the device (perhaps as part of migrating from one type of device to a device with a smaller disk). The techniques described herein address these cases by streaming only a sub-set of the desktop image while supporting on-demand requests for missing files via caching.

3.0 Example Embodiments of Desktop Streaming

FIGS. 1A and 1B are block diagrams illustrating the server-side and endpoint-side components for desktop streaming according to an example operational context. In this operational context, a (possibly quite large) number of computing devices 120 may connect to data center 102 over one or more networks 100, which may include one or more LANs and/or WANs. It is noted that, in the description of FIGS. 1A and 1B, the reference to network(s) 100 is provided to illustrate an operational context. However, a party implementing one of the techniques for desktop streaming described herein is not required to provide, make, sell or import a network or all the components of a network. Thus, while various embodiments of the techniques described herein may involve exchange of communications over one or more networks, the set of claims that issue from the present patent application should not be construed to cover, require, or otherwise include the networks themselves.

As used herein, "computing device" refers to a computer system that is operable to execute an operating system (OS) and software applications, and to store user data. Examples of computing devices include, but are not limited to, desktop computers, laptop computers, netbook computers, and wireless mobile devices such as personal digital assistants (PDAs) and smart phones like iPhone, BlackBerry, and Treo. Another example of a computing device is a virtual machine, such as VMware's player, or ESX, which executes an OS and applications just like any other hardware, except that the hardware is emulated with software. It is noted that the techniques for desktop streaming described herein are not limited to being implemented for any particular type of computing device; rather the techniques described herein may be implemented for any computing device that is operable to execute an OS and software applications and to store user data. For this reason, the examples of computing devices provided herein are to be regarded in an illustrative rather than a restrictive sense.

The term "operating system" (or "OS") is used herein in its commonly accepted meaning and refers to a set of software components (including an OS kernel) that are responsible for the allocation, management, coordination, and sharing of computer system resources that are used by other applications or components of a computing device, a computer system, or any type of computer. Examples of such computing resources include, without limitation, Central Processing Units (CPUs or processors), memory, disk storage space, network communication interfaces, and various peripheral devices such as a video display (e.g., a monitor), a pointing device (e.g., a mouse), and a keyboard. When executed on a computing device, an OS controls the operation of the computer system hardware and provides a number of services to software applications that execute on the computing device. Examples of such services include, without limitation, file system services that allow for storing and maintaining files on storage devices, memory management services that allocate and manage dynamic memory for software applications, network management services that provide for network access, user interface services (e.g., shells, command line interfaces, and graphical user interfaces) that allow users to submit commands directly to the OS, user logon and other user-related security services, and a number of other services that provide various functionalities to kernel-mode and user-mode software applications that may execute on a computing device. Typically, a software application is operable to request a service from the OS by making a system call or by executing an OS command, and to receive the results of the system call or OS command. Examples of operating systems include, but are not limited to, Unix operating systems (e.g., Solaris OS provided by Sun Microsystems, Inc., and AIX provided by IBM), Linux operating systems (e.g., Red Hat Linux and Debian Linux), and the Windows family of operating systems provided by Microsoft Corporation (e.g., Windows XP, Windows Vista, and Windows CE).

As used herein, "data center" refers to a combination of one or more computer systems and one or more storage devices that are communicatively and/or operatively connected to the computer systems, where the computer systems are operable to store and manage data in the storage devices. Examples of storage devices include, without limitation, hard disks, optical disks, and any other now known or later developed electro-magnetic or solid-state storage devices. In various embodiments and implementations, a data center may use storage devices that are installed according to various types of storage configurations. Examples of such storage configurations include, but are not limited to, directly attached storage that includes physical disks installed in computer systems; arrays of physical disks (e.g., various RAID configurations); network-attached storage (NAS) that is connected to a network and that uses file-level protocols to provide file access to various network clients; storage area networks (SAN) that provides for attaching remote storage devices (e.g., electro-magnetic or optical disk arrays, tape devices, etc.) over a network fabric in such a way that the storage devices appear local to the OSs of computer systems, and that allows the OSs of the computer systems to access and operate on data in the storage devices at the disk block level; and any combinations of multiple different storage configurations.

It is noted that in the example operational context illustrated in FIGS. 1A and 1B, the techniques described herein do not require computing devices 120 to be continuously and constantly connected to data center 102 in order to operate. Rather, the techniques described herein provide for computing devices that can operate "offline"—that is, users can use computing devices 120 without the computing devices being connected to data center 102. Thus, in the context of the techniques described herein, "offline" refers only to operating a computing device while the computing device is not connected to the data center; while operating "offline", the computing device may or may not be connected to one or more local networks or to the Internet.

Server-Side Components

FIG. 1A is a block diagram that illustrates server-side components for desktop streaming according to an example embodiment. Data center 102 includes one or more computer system(s) 104 and one or more storage devices 110 that are communicatively and/or operatively connected to computer system(s) 104. Computer system(s) 104 are configured to store and manage data in storage devices 110, such as desktop image(s) 112. It is noted that various embodiments of the techniques for desktop streaming described herein may be implemented in various operational contexts that do not necessarily include a data center. For example, the techniques described herein may be implemented between a server and an endpoint computing device over a network or over a point-to-point communication link such as, for example, a dial-up connection, a Digital Subscriber Line (DSL) connection, and an Integrated Services Digital Network (ISDN) connection. Thus, the data center in the operational context of FIGS. 1A and 1B is to be regarded merely as one possible example that is not required in all embodiments.

CVD server 106 is configured to execute on computer system(s) 104 and to manage a CVD repository of desktop image(s) 112 on storage devices 110. As used herein, "server" refers to a combination of integrated software components and an allocation of computational resources, such as memory, CPU time, and/or disk storage space, where the integrated software components are operable to perform one or more functionalities when executed by one or more processors of one or more computer systems, computing devices, or other computers.

For example, in some embodiments CVD server 106 is configured to receive from computing devices 120 changes that are made by users and applications to disk contents at the computing devices, and to apply the received changes to the corresponding desktop image(s) 112 in the CVD repository in order to update and keep current the files stored in the images. The changes that are made to the disk contents at computing devices 120 may include, but are not limited to: changes that are made to OS files (including OS configuration files such as, for example, Windows registry files) where such changes may include updating existing files, adding new files, and deleting files; changes that are made to software application files including updating existing application files, adding new application files, and deleting application files; and any other file updates, file deletions, and file insertions that are made to any user files and directories, user configuration files, and any other user data.

In another example, in some embodiments CVD server 106 may be further configured to associate each desktop image 112a-112n with metadata information (not shown in FIG. 1A) that identifies the particular computing device 120a-120n associated with that image. The metadata information for a particular desktop image may include: an image identifier that uniquely identifies that particular desktop image; a device identifier that uniquely identifies a particular computing device that stores the disk content of that particular desktop image; and any other data (e.g., such as user ID and/or other user account data) that is associated with the particular desktop image and/or the particular computing device. The set of metadata information associated with desktop image(s) 112 is used by CVD server 106 at least to determine which desktop image needs to be updated when disk content changes are received from a particular computing device, and to locate or otherwise determine which desktop image to send to a particular computing device upon request. Further, for each of desktop images 112a-112n, CVD server 106 may also be configured to store, and/or otherwise associate, a machine profile of the corresponding computing device 120a-120n. The machine profile for a computing device is a set of data that may include: one or more unique identifiers of the computing device, such as a security identifier (e.g., SID), a device identifier (e.g., a MAC address), a device name (e.g., a unique domain name or a machine name), and one or more network addresses (e.g., an IP address); a hardware identifier that identifies the hardware type of the computing device; driver configurations for OS drivers; application configurations for one or more software applications that are installed on the computing device; OS configurations that are specific to the user(s) of the computing device; and any other configuration information that is specific to the hardware and/or software components of the computing device and/or to one or more users that have local logon accounts on the device.

According to the techniques for desktop streaming described herein, CVD server 106 is configured to segment a desktop image for each computing device 120 into a prefetch set, a streaming set, and a leave-behind set that are specific to that individual computing device. For example, CVD server 106 is configured to segment desktop image 112a for computing device 120a into prefetch set 112a-1, streaming set 112a-2, and leave-behind set 112-a3. Prefetch set 112a-1 includes the smallest subset of files, in the collection of files stored as part of desktop image 112a, that is needed to boot up computing device 120a without requiring retrieval of additional files over network(s) 100. Streaming set 112a-2 includes those files, in the collection of files stored as part of desktop image 112a, that are to be sent after computing device 120a has booted up from the files in prefetch set 112a-1. Leave-behind set 112a-3 includes those files, in the collection of files stored as part of desktop image 112a, that are to be sent when specifically requested by computing device 120a. Thus, desktop image 112a for computing device 120a is segmented in a manner that is specific to computing device 120a.

CVD server 106 is configured to segment desktop images 112b to 112n for computing devices 120b to 120n, respectively, in a similar manner. However, it is noted that the desktop image for each individual computing device is segmented according to information received from that individual computing device; thus, each of the prefetch set, streaming set, and leave-behind set for each individual computing device may include files that are different from the files included in the prefetch set, streaming set, and leave-behind set for any other computing device. In this manner, CVD server 106 allows for streamlining the centralized management of desktop images for a large number of computing devices, while at the same time enables each individual computing device to start operating as quickly as possible based on the smallest set of files that are necessary for that individual computing device to start normal operation.

In an operational example, suppose that CVD server 106 receives a request from computing device 120a to download desktop image 112a. In some embodiments, CVD server 106 segments desktop image 112a into prefetch set 112a-1, streaming set 112a-2, and leave-behind set 112a-3 in response to the request for the desktop image. In other embodiments, CVD server 106 segments desktop image 112a not in response to a request for the image, but after receiving information that indicates the usage of the files at computing device 120a; in these embodiments, CVD server 106 may segment desktop image 112a by storing segmentation information that identifies the files (and/or any file system paths thereto) in each of the prefetch set 112a-1, streaming set 112a-2, and leave-behind set 112a-3 and then periodically updating the segmentation information when new file usage information is received from computing device 120a. In response to receiving the request for desktop image 112a, CVD server 106 sends prefetch set 112a-1 to computing device 120a. When computing device 120a receives prefetch set 112a-1, the computing device boots up from the files in the prefetch set. After computing device 120a has booted up, the computing device sends to CVD server 106 a request for streaming set 112a-2. In response to receiving the request, CVD server commences sending streaming set 112a-2 to computing device 120a.

While the transfer of any of prefetch set 112a-1 and streaming set 112a-2 is in progress, computing device 120a may send to CVD server 106 a specific request for a specific file in leave-behind set 112a-3. In response to such request, CVD server 106 interrupts the sending of the prefetch set or the streaming set, and sends the specific file to computing device 120a with the highest priority. This functionality of CVD server 106 ensures that computing device 120a can download any specific file on-demand and with the highest priority as soon as an application executing on the computing device requests access to the specific file. For example, requests for files in the leave-behind set may be issued in a cache-miss scenario when an application on the computing device requests access to a file that is not yet present at (or fully downloaded to) the computing device.

Endpoint-Side Components

FIG. 1B is a block diagram that illustrates endpoint-side components for desktop streaming according to an example embodiment. For illustration purposes, endpoint-side components for desktop streaming are described hereinafter with respect to computing device 120a. However, it is noted that the other computing devices in the operational context of FIG. 1A (e.g., computing devices 120b-120n) may include similar endpoint-side components.

In the example embodiment illustrated in FIG. 1B, computing device 120a is configured to connect to data center 102 over network(s) 100, where CVD server 106 in data center 102 is configured to store and manage on storage device(s) 110 one or more desktop images for the computing device. Computing device 120a comprises one or more processors and one or more volatile memory devices (not shown in FIG. 1B) as well as one or more persistent storage devices such as, for example, disk 124. Computing device 120a executes operating system (OS) 122, which includes OS components executing in kernel-mode that provide support and system resource management functionalities for applications that execute in user-mode. For example, OS 122 may include memory management modules and other routines that are configured to allocate and maintain a kernel memory address space for executing the OS kernel components (e.g., system drivers, system services, etc.) and a user-mode memory address space for executing non-kernel applications and other software modules, such as user applications 132. OS 122 also includes routines configured to support one or more file systems, such as file system 126, that are stored on disk 124.

According to the techniques described herein, computing device 120a is provisioned (e.g., manually or automatically) with endpoint-side components for desktop streaming. The endpoint-side components on computing device 120a include interceptor logic 128, streaming agent service 130, and pivot application 142. In some embodiments, the endpoint-side components for desktop streaming on a computing device may further include a network client logic for bare-metal boot over a WAN, where the network client logic is configured to initiate the streaming process at boot time in cases where the computing device does not store a runnable image that can be used to boot up the device.

As used herein, "logic" refers to a set of instructions which, when executed by one or more processors, are configured to perform one or more functionalities. In various embodiments and implementations, any such logic may be implemented as one or more software components that are executable by one or more processors or as any combination of one or more software and hardware components such as Application-Specific Integrated Circuits (ASICs). For example, any particular logic may be implemented, without limitation, as one or more software modules, as one or more libraries of functions, as one or more dynamically linked libraries, and/or as a standalone or a client-server software application.

According to the techniques for desktop streaming described herein, interceptor logic 128 is configured to intercept all file system calls and to collect metadata information about the usage of the files in file system 126. The collected metadata information is used to determine which files need to be streamed first from data center 102 in order to boot up computing device 120a as fast as possible and which files need to be streamed with priority thereafter in order to ensure smooth operation; for example, the metadata information collected by interceptor logic 128 may be used by CVD server 106 to predict in what order the files of a desktop image for computing device 120a should be streamed and to segment the image into a prefetch set, a streaming set, and a leave-behind set. Interceptor logic 128 is also configured to serve files that are missing at computing device 120a by blocking file requests from applications executing on the device, fetching the files or file blocks thereof through streaming agent service 130, and then returning to the applications proper file handles when at least some portion of the missing files are downloaded to the computing device.

In some embodiments, the interceptor logic is implemented as a filter driver that is installed in the kernel of the underlying OS and is configured to execute on top of the file system to track every request for access to any file stored in the file system, including the OS configuration files. For example, in these embodiments the interceptor logic is configured to track access to the OS configuration database files (e.g., Windows registry files) at the granular level of individual database entries, thus requiring the locking only of individual entries as opposed to the entire database file(s). This also allows the interceptor logic to track changes (e.g., updates, insertions, and deletions) to individual configuration database entries, which facilitates faster and computationally less expensive updates to a corresponding desktop image that is centrally managed at a remote location such as, for example, a data center. In other embodiments, the interceptor logic may be implemented as a driver, application, or some other software component that is configured for execution in user-mode to intercept and track request for access to some or all of the files stored in the underlying file system.

According to the techniques described herein, streaming agent service 130 is logic that is configured to communicate with CVD server 106 and to coordinate the streaming of the files in the desktop image stored at data center 102 for computing device 120a. In some embodiments, streaming agent service 130 may comprise network optimization modules (which may also be included at the server side as part of, or in conjunction with, CVD server 106) that are configured to optimize the streaming transfer of data over network(s) 100 by de-duplicating and compressing the data.

Pivot application 142 is logic that is configured to execute on computing device 120a during the very early boot stages and to perform an atomic switch operation for a new (partially downloaded) image for the computing device followed by a re-boot from the files in the new image. For example, pivot application 142 is configured to atomically perform an in-place replacement of current files in file system 126 with the files in the prefetch set of a new desktop image for computing device 120a and then to re-boot the device, which effectively causes the device to boot from the new files in the prefetch set. In some embodiments, pivot application 142 is implemented as a native application that uses a native Application Programming Interface (API) to trap into the kernel of OS 122, which allows the pivot application to be started very early into the boot-up process and to be the only process running when it replaces the current files in file system 126 with the files in the prefetch set of the new desktop image.

3.1 The Streaming Procedure

In an example embodiment of the techniques for desktop streaming described herein, the flow of the streaming procedure between an endpoint computing device and a CVD server is as follows.

1. The streaming client (e.g., a streaming agent service) on an endpoint computing device issues a request to stream a desktop image for the device.

2. The CVD server receives the client request and authenticates the end user of the computing device based on the user credentials included in the request. Examples of such user credentials may include, but are not limited to, a network account/logon ID, a domain or directory account ID, and a password or other security information. The CVD server then looks up, in the CVD repository, the desktop image that matches the user credentials in the client request. The CVD server then determines, based on the client request, if the endpoint computing device is bare-metal or is running an existing image. A typical use case of the latter type is when a new hardware contains a vanilla Windows image, or when an image needs to be replaced but is still able to connect to the network and initiate the streaming procedure. A typical case of the former type is when there is no working image at the endpoint device that can execute the streaming procedure, in which case the endpoint device needs to boot over the network and then start the streaming procedure. Details of techniques for such bare-metal boot over the network are described hereinafter in Section 3.5.

3. The CVD server segments the collection of files in the desktop image into three components: the prefetch set, the streaming (or background fetch) set, and the leave-behind set. The CVD server then sends to the streaming client on the endpoint device the "manifest" of the prefetch set, e.g., a list of files that comprise the prefetch set. Details of techniques for image segmentation and ordering are described hereinafter in Section 3.2.

4. The streaming client on the endpoint device downloads the list of files included in the prefetch set by invoking a network optimization module that is included in, or works in conjunction with, the streaming client. The prefetch set gets downloaded and stored in a staging area on a permanent storage device (e.g., a disk) at the endpoint device. Details of techniques for network optimizations are described hereinafter in Section 3.6.

5. Once the download of the prefetch set is complete, the streaming client on the endpoint device performs pre-boot tasks related to switching the current image on the device with the files from the prefetch set, and then requests the user to reboot. During the boot, a pivot application performs actions to atomically switch the current image with the new image. Details of techniques for atomic switching of images are described hereinafter in Section 3.4.

6. When the endpoint device completes the boot sequence, the user can start working with the newly restored image normally as if the entire image is local and has been downloaded, even though only the files in the prefetch set reside physically on the device's disk. While the user is working, the streaming client on the endpoint device downloads the files in the streaming set in the background.

7. During the process of streaming the files in the streaming set, the user (e.g., through an application executing on the endpoint device) may request a file that is not in the prefetch set and has not yet been downloaded as part of the streaming set. In this case, the interceptor logic on the endpoint device intercepts the file request and issues an on-demand request to the CVD server to fetch the missing file. Such on-demand requests are expected to incur some delay from the perspective of the user since they involve interaction over the network; however, in accordance with the techniques for desktop image segmentation described herein, the chance of such on-demand requests occurring is likely to be below 10%. Details of techniques for processing such on-demand requests are described hereinafter in Section 3.3.

8. Throughout the operation of the endpoint device, including when the user is offline, the interceptor logic continuously collects information related to file usage at the endpoint device. The collected information is sent back to the CVD server periodically, and is used by the CVD server to improve the image segmentation and download ordering as described hereinafter.

9. In some cases, the CVD server may need to alter the contents of the desktop image before streaming the desktop image to the endpoint device, depending on the current hardware configuration of the endpoint device and whether the current hardware configuration differs from the hardware configuration on which the desktop image was last executed. In these cases, according to the techniques described herein the CVD server is configured to perform a rebase operation on the desktop image before streaming the desktop image to the endpoint device. Details of techniques for performing such rebase operation are described hereinafter in Section 3.7.

Figure 2:
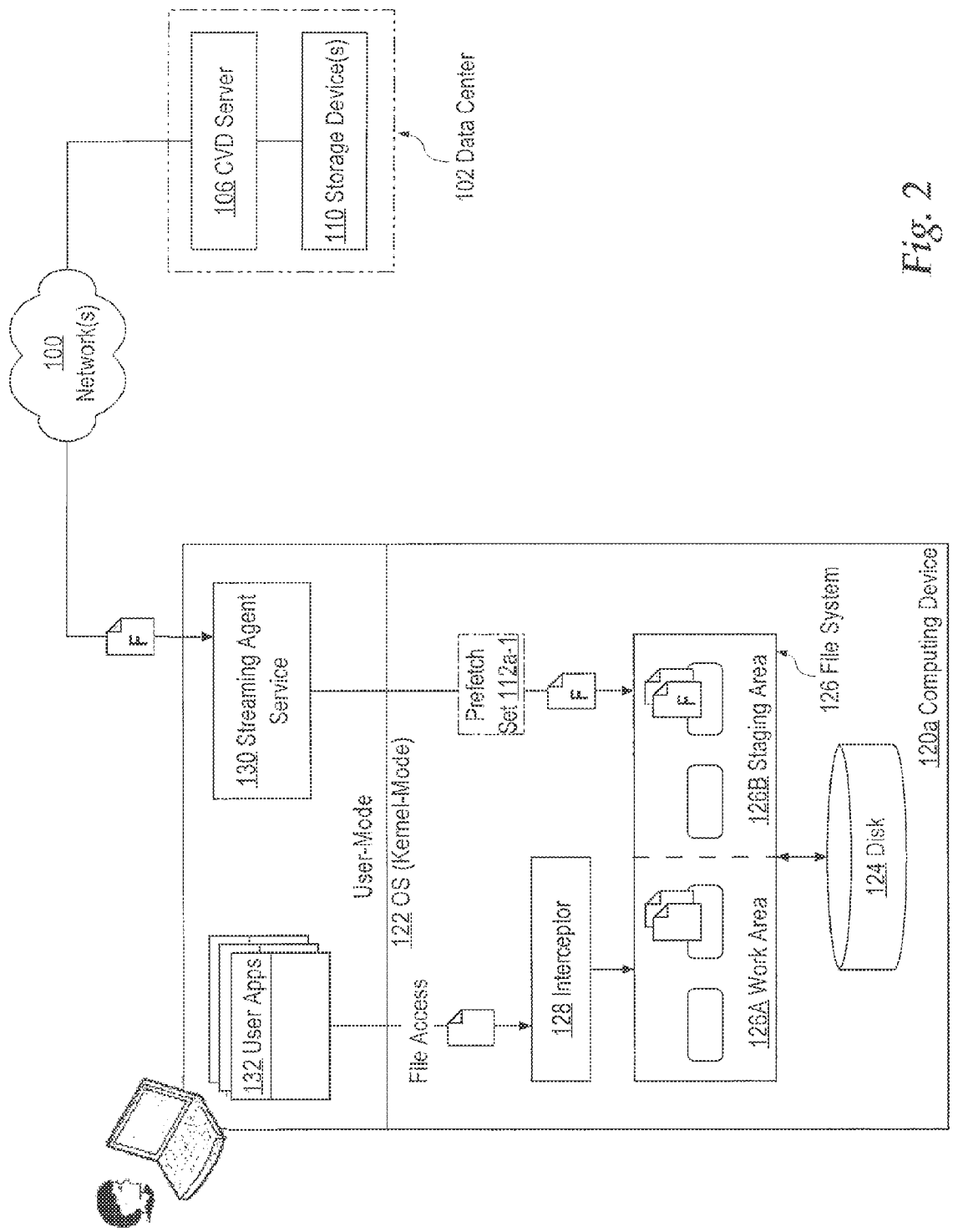
FIG. 2 is a block diagram that illustrates a prefetch phase according to an example embodiment.
Figure 3:
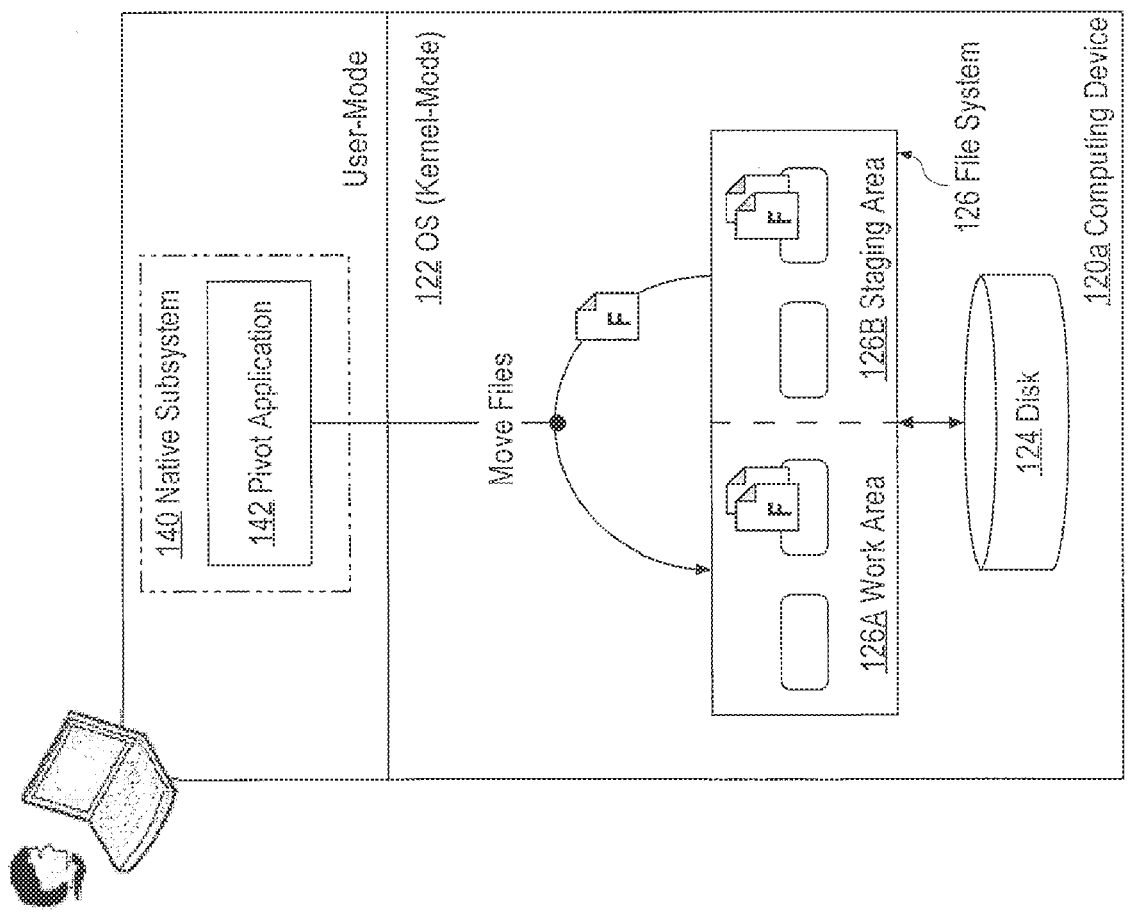
FIG. 3 is a block diagram that illustrates a pivot phase according to an example embodiment.
Figure 4:
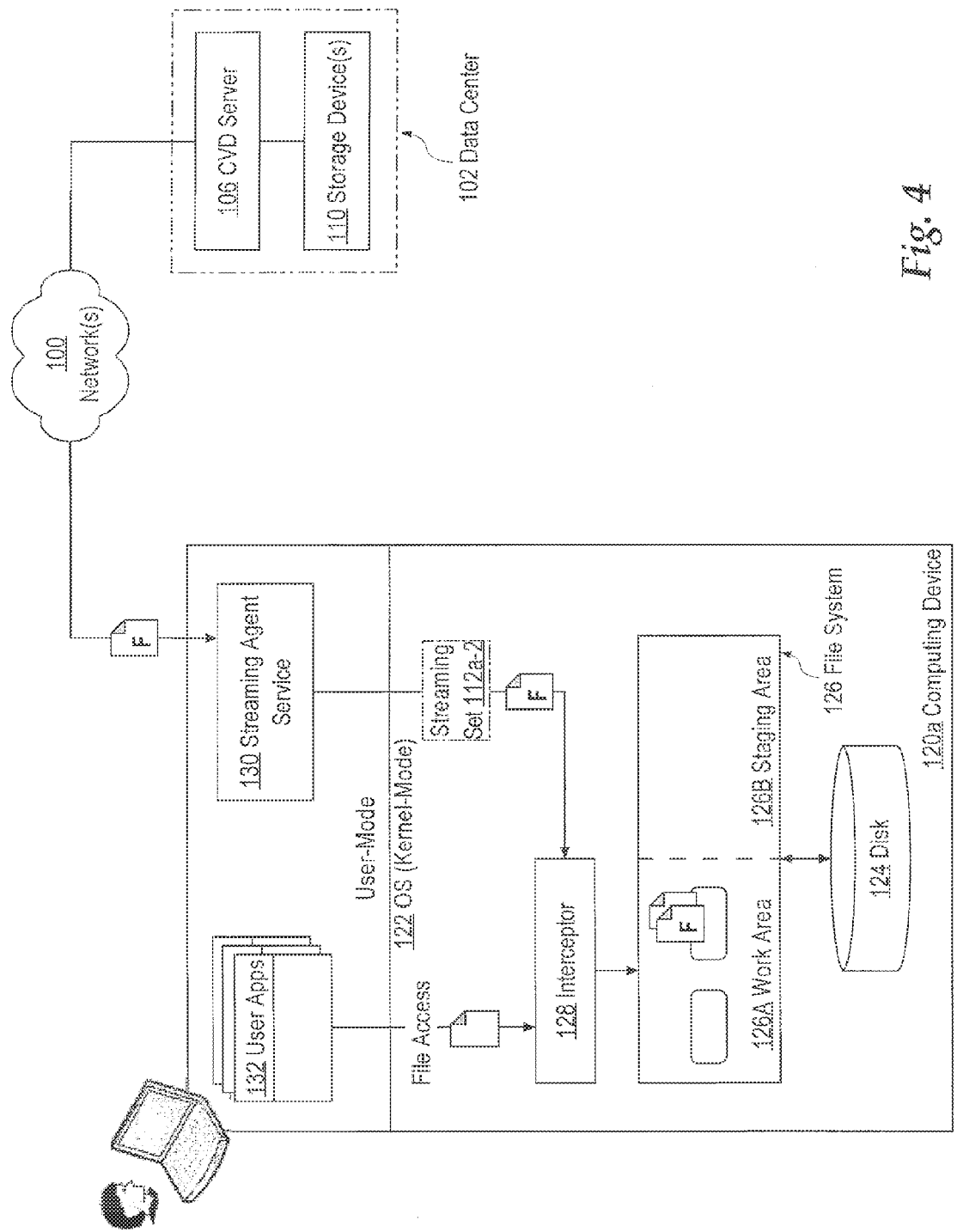
FIG. 4 is a block diagram that illustrates a streaming phase according to an example embodiment.

In an example embodiment, the flow of the streaming procedure includes a prefetch phase (illustrated in FIG. 2), a pivot phase (illustrated in FIG. 3), and streaming phase (illustrated in FIG. 4). As illustrated in FIGS. 2-4, the prefetch phase, the pivot phase, and the streaming phase are described with respect to computing device 120a in the operational context illustrated in FIGS. 1A-1B. In that operational context, computing device 120a is configured to connect to data center 102 over network(s) 100, where CVD server 106 in data center 102 is configured to store and manage on storage device(s) 110 one or more desktop images for the computing device. Computing device 120a comprises one or more processors, one or more volatile memory devices, and one or more persistent storage devices such as, for example, disk 124. Computing device 120a executes interceptor logic 128 in the kernel address space of OS 122, while streaming agent service 130 and pivot application 142 are executed in user-mode on top of OS 122.

FIG. 2 is a block diagram that illustrates an example prefetch phase. In the prefetch phase, streaming agent service 130 sends a request for desktop image 112a to CVD server 106. This may happen in response to a specific request from a user of computing device 120a, or in response to an automatic request from a service or other agent on the computing device to download a new desktop image from data center 102. CVD server 106 receives the request and authenticates the end user of the computing device based on the user credentials that are included in the request. CVD server 106 then looks up, or otherwise determines, which desktop image on storage device(s) 110 matches the user's credentials. Based on the look up, CVD server 106 determines that the matching desktop image is image 112a (not shown in FIG. 2). CVD server 106 then segments the collection of files in desktop image 112a into prefetch set 112a-1, streaming set 112a-2, and leave-behind set 112a-3. CVD server 106 then sends to streaming agent service 130 the list (or "manifest") of files that comprise prefetch set 112a-1.

After receiving the list of files in prefetch set 112a-1, and while the user may be working on the current image on computing device 120a, streaming agent service 130 commences downloading of the files in the prefetch set and storing these files in staging area 126B. Staging area 126B may be configured as a designated directory or a separate (possibly hidden) partition within file system 126 on disk 124.

Once the download of prefetch set 112a-1 is completed, streaming agent service 130 performs pre-boot tasks related to switching the current image, which is stored in work area 126A, with the files from the prefetch set. Examples of such pre-boot tasks may include, without limitation, verifying the file system paths for the files in prefetch set 112*a*-1 against the work area 126A, adjusting as necessary file and directory metadata for the files in prefetch set 112*a*-1 and/or for the files in the current image in work area 126A, and storing an indication (e.g., a flag or other entry in an OS configuration file) in order to cause pivot application 142 to be executed upon the next reboot of computing device 120*a*. Streaming agent service 130 then prompts or otherwise requests the user to reboot.

FIG. 3 is a block diagram that illustrates an example pivot phase that is performed by pivot application 142. Pivot application 142 is a native application included as part of native subsystem 140 on computing device 120*a*. Native subsystem 140 also includes a native API that allows native applications to make calls into the kernel of OS 122 and to be started very early into the boot-up process before any other files in file system 126 have been accessed or locked. When executed, pivot application 142 moves the files of prefetch set 112*a*-1 from staging area 126B to work area 126A, as well as deletes files/directories in the work area as necessary, thereby effectively replacing the current image on computing device 120*a* with the new image 112*a*. This replacement operation is performed in an atomic manner in order to ensure that all files from prefetch set 112*a*-1 have been stored in the appropriate corresponding file paths in work area 126A. This ensures that computing device 120*a* will be able to subsequently boot from a set of files (the prefetch set 112*a*-1) that are internally consistent with each other. After performing the replacement operation, pivot application 142 terminates the boot and causes computing device 120*a* to reboot. Upon rebooting, computing device 120*a* boots from the current files in work area 126A, whose current files are now the files from the downloaded prefetch set 112*a*-1.

FIG. 4 is a block diagram that illustrates an example streaming phase. In the streaming phase, when computing device 120*a* has completed the boot sequence and has rebooted from the files in prefetch set 112*a*-1, the user can start working normally as if the entire new image 112*a* has been downloaded and stored locally on disk 124, even though only the files in the prefetch set 112*a*-1 reside physically on the local disk. While the user is working, streaming agent service 130 requests from CVD server 106, and commences downloading in the background, the files that have been assigned by the CVD server into streaming set 112*a*-2. The files in streaming set 112*a*-2 are downloaded and stored in work area 126A of file system 126.

During the process of streaming the files in streaming set 112*a*-2, a user application 132 may request to access a specific file that was not downloaded as part of prefetch set 112*a*-1 and has not yet been downloaded as part of streaming set 112*a*-2. Interceptor logic 128 intercepts the request for the file, determines that the file has not yet been downloaded, and blocks the request. Interceptor logic 128 then issues a request to streaming agent service 130 to fetch this missing file. Streaming agent service 130 issues an on-demand request for the missing file to CVD server 106, and in response thereto CVD server 106 interrupts the transfer of the files in streaming set 112*a*-2 and transmits the missing file with the highest priority. Streaming agent service 130 receives the file (or at least a portion thereof), stores the file (or the portion thereof) at the appropriate file system path in work area 126A, and notifies interceptor logic 128 accordingly. When interceptor logic 128 determines that the specific file (or a sufficiently usable portion thereof) has already been downloaded and stored locally, the interceptor logic unblocks the request from user application 132 and returns a valid file handle to the requested file.

Throughout the operation of computing device 120*a*, including during the boot phases and when the user is offline, interceptor logic 128 continuously collects information related to the usage of, and access to, files and blocks in file system 126. The collected information is sent by streaming agent service 130 to CVD server 106 periodically, and the CVD server uses the collected information to improve the image segmentation and download ordering for the files in desktop image 112*a* for computing device 120*a*.

In the above manner, the techniques for desktop streaming described herein ensure that computing device 120*a* is able to boot up from the files in the new desktop image as quickly as possible based on the smallest set of files (e.g., the files in prefetch set 112*a*-1) that are necessary for starting the normal and usual device operation without sacrificing the experience of the end user. The techniques described herein also provide a mechanism for downloading files on-demand with the highest priority, which ensures that a user application is able to access a missing (not yet downloaded) file from the new desktop image without any significant delay.

3.2 Desktop Image Segmentation

In an example embodiment, a desktop image for an endpoint computing device is segmented into the following components:

1. The "prefetch set". The prefetch set includes the smallest subset of files, in the collection of files included in the desktop image, that are needed to reside at the endpoint device in order to be able to:

a. Boot the endpoint device and reach a "log-in" screen without requiring network access to fetch more files during the boot process. Properly identifying the files in the prefetch set ensures the correct and efficient execution of the desktop image at the endpoint device.

b. Provide adequate user experience, by downloading files and executables that are likely to be used by the user during and soon after the boot up based on historical usage patterns of the user.

2. The "streaming set". The streaming set includes the subset of files, in the collection of files included in the desktop image, that are destined to be downloaded to the endpoint device in the background, while the user is already working. This is typically a large set, so the techniques described herein provide a mechanism to determine an effective download ordering of the streaming set that predicts the expected usage of the user.

3. The "leave-behind set". The leave-behind set includes those files, in the collection of files included in the desktop image, that are unlikely to be accessed by the end-user, which is determined based on previously recorded access patterns. Therefore, the files in the leave-behind set are kept in the data center and are not downloaded to the endpoint device ahead of time. These files will be downloaded to the endpoint device only if accessed by the user or by an application running on the endpoint device, and are downloaded using an on-demand mechanism. Determining the files in the leave-behind set is performed as part of the streaming set ordering and ranking procedure.

4. The unmanaged ("temp") set. The unmanaged set includes files that are technically not part of the desktop image, and contains all the files that reside on the physical endpoint device that are not centrally managed at the data center (and hence not protected upon restore from the data center either). In some embodiments, the files in the unmanaged set are determined by a policy, which may be configured by an administrator, to exclude files that are of no interest from a protection perspective. Examples of such files include temporary files and other types of files that are transient in nature. Since the files in the unmanaged set are not part of the centrally managed and protected desktop image, handling of these files is not specifically discussed in the present application.

Figure 1C:
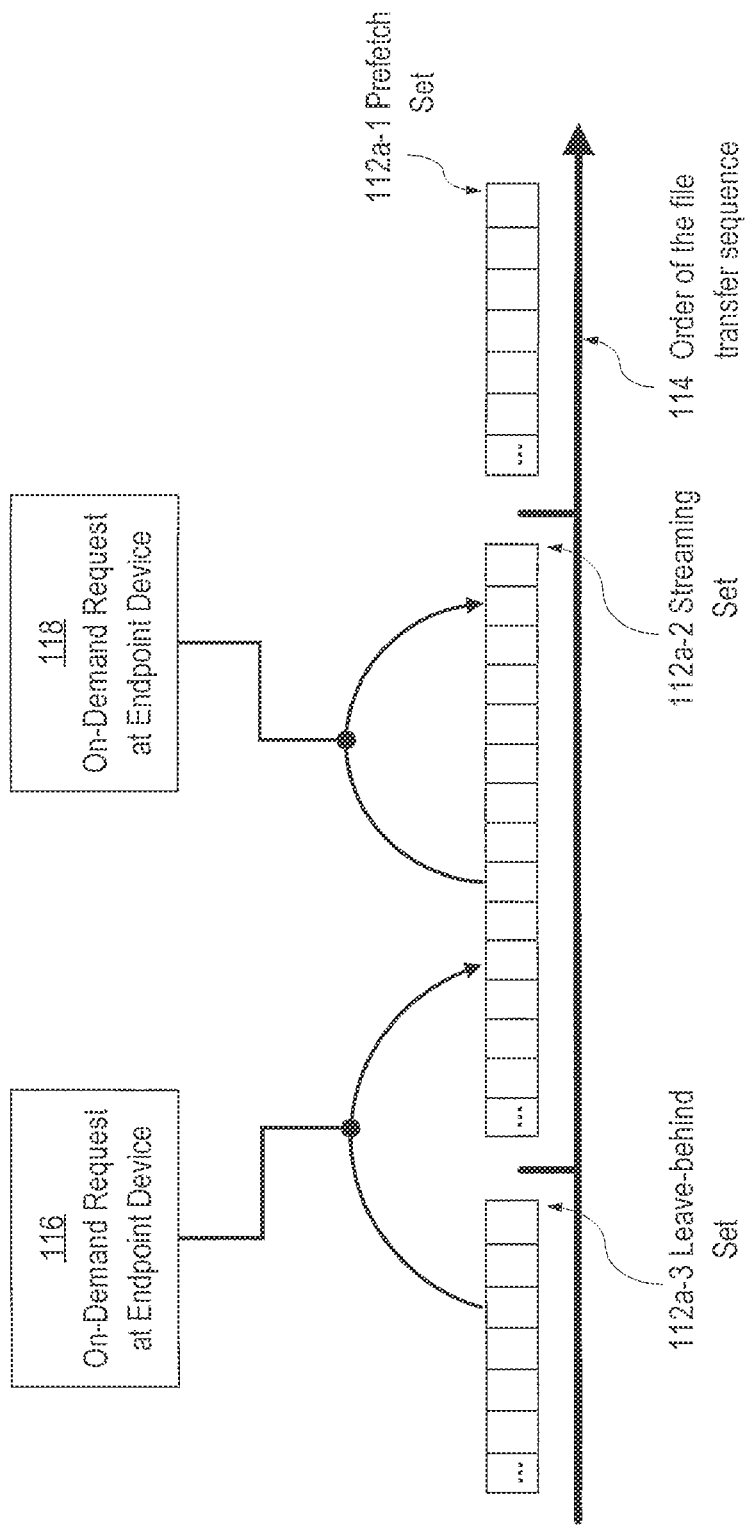
FIG. 1C is a block diagram that illustrates the order of a file transfer sequence used in desktop streaming according to an example embodiment.

One way to represent the segmentation of a desktop image is as an ordered list of files, whose order, or rank, is based on the "importance", or expected access to these files. FIG. 1C is a block diagram that illustrates the rank assigned to files in a desktop image as part of segmenting the desktop image. Specifically, with respect to the operational context described in FIG. 1A, FIG. 1C illustrates how desktop image 112a is segmented into prefetch set 112a-1, streaming set 112a-2, and leave-behind set 112a-3. The rank assigned to each file in desktop image 112a as part of the segmentation process determines order 114 of the sequence in which the files in the desktop image are transferred to endpoint device 120a. On-demand requests for files at the endpoint device can impact the streaming order 114. For example, an on-demand request 116 for a specific file may cause that file (and/or other file system objects related thereto) to be moved from leave-behind set 112a-3 to streaming set 112a-2. In another example, an on-demand request 118 for a specific file may cause that file (and/or other file system objects related thereto) to be moved ahead in the streaming order within streaming set 112a-2.

One approach for segmenting a desktop image may involve varying the boundaries between the three sets (prefetch set, streaming set, and leave-behind set) based on network conditions. However, this approach has a major flaw. Considering a low-bandwidth high-latency network, downloading a large prefetch set to an endpoint device would result in a long period of time before the user of the endpoint device can start working, which may be unnecessary if the prefetch set contains files that are unlikely to be accessed by the user. Downloading a too small prefetch set would result in a quick turnaround before the user can start working, but will likely incur long delays due to increased chance of requests for missing files (e.g., files that have not yet been downloaded), which would lead to a bad user experience if a large number of missing files need to be fetched over the network on-demand.

To address these and other issues with image segmentation, the techniques described herein provide a mechanism for segmenting a desktop image (into a prefetch set, a streaming set, and a leave-behind set) that is invariant of the network conditions and is configured to operate based on anticipated usage patterns that are determined from file usage information collected at the endpoint device. Specifically, according to the techniques described herein, the prefetch set should include all the files that the user is likely to access during and soon after boot up, the leave-behind set should include those files that are highly unlikely to be accessed, and the streaming set should be ordered based on the likelihood of the files within the set to be accessed by the user.

According to the techniques described herein, another consideration that may be taken into account when segmenting a desktop image is the size of the disk at the endpoint device. For example, in some operational scenarios, the endpoint device may need to download a desktop image that was previously used by a computing device with a larger disk space. In these scenarios, the sum of the size of the files in the prefetch set and streaming set should not exceed the size of the physical disk space of the endpoint device because otherwise the endpoint device might never end the phase of transferring the streaming set as it will perpetually evict files from the local disk and then bring them back as part of the streaming set. To address this, in some embodiments the CVD server that performs the image segmentation may be configured to decrease the size of the streaming set and increase the size of the leave-behind set in order to ensure that the endpoint device can store the files in the streaming set on its local disk and can resume operation after the streaming set has been downloaded and stored on the local disk.

To implement image segmentation, some embodiments provide logic which may be included in a CVD server and which, when executed, is operable to segment a desktop image into a prefetch set, a streaming set, and a leave-behind set in accordance with the techniques described herein. For example, in response to a request for a desktop image, the segmentation logic may traverse the files stored in the desktop image and may assign a rank indicator to each file. The segmentation logic determines the rank indicator for each file based on information indicating the most recent usage of that file at the endpoint device associated with the desktop image. The rank indicator for any particular file includes one or more data values that identify one of the prefetch set, the streaming set, and the leave-behind set. For files in the streaming set, in some embodiments the rank indicator assigned to a particular file may also indicate the order of that particular file within the streaming set; in other embodiments, additional order value(s) may be stored along with the rank indicator to specify the order of that particular file within the streaming set. After determining the rank indicator for a particular file, the segmentation logic stores a record or entry that associates the determined rank indicator with a file identifier (ID) of the particular file in one or more data structures in volatile memory and/or on persistent storage. The file ID stored in the record or entry may include a filename (and/or other identifier, such as a file number) and/or a file system path identifying the directory where the particular file is stored in the file system of the endpoint device. The data structures, which store the records or entries with the file ID/rank indicator associations for the files in the desktop image, may include without limitation lists, arrays, tables, queues, and any other data structures that are suitable for storing records or entries in volatile memory and/or on permanent storage.

Determining the Prefetch Set

According to the techniques described herein, the prefetch set includes at the very least the set of files that are used by an endpoint computing device to reboot, possibly without network access or access to the CVD server. In an example embodiment, the prefetch set may include two sub-sets: a static set and a dynamic set.

Static set. The static set is not necessarily individualized and includes known files from the OS and core applications that have been analyzed as crucial for enabling the endpoint device to boot. The static set also includes the files that comprise the streaming client software, e.g., the files for the streaming agent service that is executed on the endpoint device. The static set typically does not include significant portions from a bare OS installation. Examples of elements that are excluded from the static set include, but are not limited to, un-installation files and data, DLL cache, user profile files and driver store files. Additionally, many OS files are classified as temporary files, which should not be downloaded to the endpoint device, thereby significantly reducing the size of the prefetch set. In some embodiments, the static set may also include files that comprise one or more of the endpoint-side components (e.g., interceptor logic, streaming agent service logic, and pivot application) or any new versions thereof.

Dynamic set. The dynamic set includes a set of files that are maintained on a per-device basis and that augment the static set in order to ensure that the endpoint device can operate normally and provide good user experience. The logic used to determine the dynamic set is rooted in the ability of an endpoint device to intercept and record access to files, along with a timestamp of the access event. Also, the endpoint device can record system events such as a user log on and log off, the device is being booted or shutdown, etc. Using this collected information, the logic applies a set of heuristics to generate a list of the files in the dynamic set. Once collected, the list (or manifest) of files of the dynamic set is uploaded to the CVD server on the next steady state upload. This manifest enables the CVD server to learn and remember what applications and files will be used by the endpoint device when it boots up after an image restore operation. In this learning process, the CVD server may perform two steps: augment the previous dynamic set with new files that have been recently accessed; and/or reduce the dynamic set by removing files that have been previously accessed but are not accessed in more recent sessions. Examples of the heuristics that are used to determine the dynamic set include:

a. Use of a configurable time parameter. Files that were accessed at the endpoint device from boot time and until the device has been active for X minutes, whereby X is a configurable value and should correspond to the typical sequence that occurs from boot time until a log-in screen appears.

b Use of a system event parameter. Alternatively, or in addition to files identified by using other heuristic parameters, the endpoint device can collect the list of all files that were accessed until the log-on event occurs.

c. Use of recently or frequently accessed files. This is a list of data files and executable files that have been most recently accessed by the user on the endpoint device. A threshold value of X days may be used to determine the boundary between files in the prefetch set and in the streaming set, where a typical value for X may be 5 days. Alternatively, a list of frequently accessed files may be used to determine the inclusion in the dynamic set.

d. Use of a sticky set. The sticky set includes program and configuration files, which might not be otherwise assigned in the static set because they are not part of the standard OS or are specific per-organization and which might not be otherwise assigned in the dynamic set or the frequently accessed set because they are not always invoked, but which are nevertheless assigned in the prefetch set because in certain circumstances they need to be resident on the endpoint device so that the device can operate normally. An example of sticky set files are files for a VPN application or client, which resides on the endpoint device in order to enable the endpoint device to connect to the CVD server to start the streaming procedure. If the VPN application or client is not used when a user works at her office, its files might be missing from the frequently accessed set but these files still need to be included in the prefetch set in case a new image needs to be downloaded to the endpoint device while the user is working from home. Thus, the provision of the sticky set allows such programs and configuration files to be made part of the prefetch set either by automatic provisioning or through input received from an administrator that identifies such programs and configuration files.

Leveraging OS mechanisms to augment the dynamic list. Operating systems typically have built-in mechanisms for monitoring the most frequently used applications (per user). For example, in Windows XP, such information is collected by Windows Explorer and is internally stored in a data structure referred to as UserAssist. The UserAssist information is displayed on the user's Start menu and is based on application launch count statistics. Thus, in some embodiments, this built-in OS mechanism is leveraged as an additional heuristic for determining the set of files to include as part of the dynamic set. Some additional Windows OS mechanisms which are useful for this purpose are the Prefetch and SuperFetch mechanisms. The Prefetch mechanism records the order of page faults during boot and during process launches and uses these recordings to pre-fetch the data when the applications are launched later. The SuperFetch mechanism monitors which applications are used most and preloads these applications into dynamic memory so they're ready when needed by the user.

Recovering from an insufficient prefetch set. In case the endpoint device fails to boot successfully from the prefetch set (e.g., because there were insufficient files in the set), the endpoint device can recover itself by issuing a request to the CVD server for a "safe-mode" restore, which involves the downloading of a "safe set" of files. The safe set is an extension of the static and dynamic sets, and ensures successful boot because it includes all the files from the entire OS image (but still excludes personal files and user-specific applications). The existence of such "safe static set" with the entire OS image enables the use of a more aggressive (e.g., smaller) static set and hence a faster restore process, since in case the boot from the static set fails the endpoint device would be able to enter safe-mode and still boot properly (although slower). It is noted that for normal operation after the first phase of the restore operation of a new image onto the endpoint device, some services such as networking should work properly on the endpoint device. If this is not the case, the last resort for the endpoint device is to boot over the WAN, as described hereinafter in Section 3.5.

Evicting Files from the Prefetch Set and the Streaming Set

Since the amount of data stored in a desktop image at the data center may exceed the physical disk at the corresponding endpoint device, there could be a situation in which the sum of the sizes of the files in the prefetch set and the streaming set exceeds the physical disk size. To address cases where the disk at the endpoint device is low on available space, the techniques described herein provide eviction logic that may execute as a separate application or as part of the steaming agent service on the endpoint device. When executed, the eviction logic removes files from the disk on the endpoint device based on criteria that are opposite to the criteria for determining the prefetch set. For example, files that are candidates for eviction are least recently used, least frequently used, and non-sticky. The eviction logic performs the eviction procedure until enough disk space is freed. It is noted, however, that while the files are removed from the disk on the endpoint device, these files still exist in the desktop image stored in the data center and can be accessed and restored to the endpoint device on-demand. In effect, the removal of these files from the disk on the endpoint device has the semantics of adding these files to the leave-behind set of the desktop image at the data center.

Ordering the Streaming and the Leave-Behind Sets

One goal of effective desktop streaming is to ensure that the user experience post-streaming would be acceptable. In particular, there is a need to reduce the chances of a "cache-miss" (e.g., of a request for a file that has not yet been downloaded) at the endpoint device, which would cause fetching the file in real-time over the network thus causing delays. To minimize the chances of a "cache-miss", according to the techniques described herein the streaming set is ordered based on the file access patterns as detected by the interceptor logic on the endpoint device. This ordering procedure operates similarly to the procedure for generating the dynamic set, except that it keeps a rank of the more recently accessed files across multiple user sessions on the endpoint device. Specifically, one or more components on the endpoint device (e.g., the interceptor logic and/or the streaming agent service) keep track of which files were used and their frequency of use, and create a ranked list of files based on the access patterns. The ranked list is sent to the CVD server and is kept in the data center as metadata information associated with the desktop image for the endpoint device. Upon a request to restore the desktop image onto the endpoint device, the streaming set is constructed by the CVD server in such way that more frequently and recently used files are placed higher in the ordered list. The ranked list of files may include program files as well as user data files. By applying this ordering procedure, applications and files that are frequently used by the user of the endpoint device are likely to be resident at the device when the user actually needs them, thereby avoiding a "cache-miss" scenario.

Files at the bottom of the ranked list of files (e.g., files that have not been accessed the longest time) are placed on a list that identifies the leave-behind set and are never streamed. For example, a default threshold value for moving files from the streaming set to the leave-behind set may be 6 months. That is, files that have not been accessed by the user on the endpoint device for more than 6 months are not going to be part of the streaming set. It is noted that if access to such files is requested, these files will be served on-demand just like any other streamed file. However, if such files are not accessed ever on the endpoint device, there is no point in sending them unnecessarily over the network.

Re-ordering the streaming set based on on-demand access. Another mechanism to affect the transfer priority of the files in the streaming set is based on on-demand access. That is, when files are accessed on-demand (because they have not yet been streamed to the endpoint device), then the endpoint device should look at files that are related to these files, and place them at the top of the ranked list of files that is sent to the CVD server. For example, an on-demand request for an executable Winword.exe would increase the priority of the entire "c:\Program Files\Microsoft Office\" directory, or of all files with a .docx extension.

Re-ordering the streaming set based on offline access. When the endpoint device is operating offline (e.g., is disconnected from the data center), and a user application attempts to access a file that has not yet been downloaded, the interceptor logic records this request. When the endpoint device reconnects to the data center, the interceptor logic sends to the CVD server the list of missing files for which there were access requests, and the CVD server re-prioritizes these files by placing them at the top of the streaming set.

Filtering Out Scanners From the Ranking Procedure

Some software programs operate by scanning the entire file system on an endpoint computing device. For example, desktop search programs scan the file system in order to generate indexes for future searches, and anti-virus software scans the file system to identify threats to the endpoint device. Clearly, such scanning programs would invalidate the ranking of file access by the user since they access every file in the file system. In order to eliminate their impact on the ranking order, according to the techniques described herein the interceptor logic maintains a list of such scanning programs and is configured to ignore file access from such scanning programs when performing the file ordering and ranking procedures to generate ranking lists of files. Additionally, in some embodiments the interceptor logic could employ a heuristic such that when a specific process is performing consecutive access (open, read, close) to a large number of files, the specific process would be automatically entered in to the "scanners" black list and excluded from the ranking (this is similar to Web crawlers being excluded from the access-based ranking algorithms).

3.3 The Interceptor

According to the techniques for desktop streaming described herein, an endpoint computing device is provisioned with interceptor logic. In some embodiments, the interceptor logic is implemented as a file-system mini-filter driver that is configured to intercept file system events and requests for multiple purposes. As described hereinafter, examples of such purposes include, without limitation, tracking file and directory modifications, determining the dynamic set in the prefetch set, virtualizing the file system, block-level on-demand streaming, and offline support.

Tracking File and Directory Modifications

To provide ongoing data protection in various operational contexts, the implementations of desktop streaming need to be able to detect file and directory modifications. To address this, the techniques for desktop streaming described herein provide for tracking such modifications by using a lightweight tracking layer which is implemented in the interceptor logic. Using a kernel-mode interceptor logic for tracking file and directory changes allows embodiments of the techniques described herein to swiftly detect all modified files/directories and to provide fast ongoing data protection without the need to repeatedly perform a full scan of the entire file system for syncing the protected data with the data in the corresponding desktop image stored at the data center.

In some embodiments, the lightweight tracking layer implemented in the interceptor logic may include one or more optimization mechanisms that minimize the tracking overhead, thereby making this layer almost transparent. Examples of such optimization mechanisms include, but are not limited to:

for fast access, tracked modifications are queued in an in-memory kernel queue;

the in-memory kernel queue employs de-duplication mechanisms to keep the queue size small;

to minimize tracking overhead, only file creation/rename/close operations need to be tracked.

Determining the Dynamic Prefetch Set

In order to provide a good streaming experience, the techniques described herein segment a desktop image into a prefetch set, a streaming set, and a leave-behind set. As discussed above, one of the components in the prefetch set is the dynamic set. In some embodiments, the interceptor logic is configured to track the files included in the dynamic set by intercepting file access requests and keeping track of the identifiers of the accessed files using mechanisms similar to the "tracking file modifications" mechanisms described above.

In order to accurately record the dynamic set, in some embodiments the interceptor logic is configured to start very early in the boot process of the endpoint device before any (or very few) files are accessed in the file system. It was observed that each boot on the endpoint device is not identical to, but is different at least slightly, from every other boot for the same user on the same endpoint device. Further, it is noted that desktop streaming does not need to be performed each and every time an endpoint device reboots—rather, around 90% of the boots do not require streaming. However, on the occasions when desktop streaming is needed or expressly requested by the user, having a very accurate prefetch set/dynamic set can increase the chances of a successful boot to almost 100%. In order to achieve such success ratio, in some embodiments the interceptor logic is configured to load and execute on each boot before all (or substantially all) file access requests are made to the file system. Thus, the interceptor logic records all (or substantially all) files that are accessed during each boot and uses the recorded information to make an accurate prediction of which files are likely to be accessed on the next boot. The interceptor logic includes these predicted files in the list for the prefetch set/dynamic set that is reported to the CVD server. This prediction of which files should be in the prefetch set/dynamic set continuously improves over time because the interceptor logic records all (or substantially all) accesses to files in the file system during each and every boot.

File System Virtualization

In addition to downloading fast the prefetch set and downloading in the background the streaming set onto the image that is currently running on an endpoint device, the endpoint device is also configured to handle requests for files and other file system objects that are not yet resident on the local disk of the device. While the prefetch set and the ordering procedure for the streaming set lead to an over 90% hit ratio, there is still a chance that a user application will request access to a file that has not yet been downloaded. To address such requests, the interceptor logic includes a module that is configured to present a full file system to user applications and other clients on the endpoint device, but at the same time supports "holes" in the file system that consist of stubs representing files that have not been downloaded yet. When a user application requests access to such missing files (e.g., files identified by stubs), the interceptor logic blocks the application request and fetches the missing file over the network. When the file has been fetched on-demand and stored locally, the interceptor logic unblocks the application request and replies to the requesting application with a file handle. To further minimize the delay in processing, such requests for missing files are handled with the highest priority and with precedence over any background streaming activity.

In this manner, the interceptor logic is actually responsible for virtualizing the underlying file system for both user-mode applications, kernel-mode drivers, and the operating system itself.

While the streaming agent service on the endpoint device is in streaming mode (e.g., downloading the streaming set of the desktop image), all operating system components observe a completely normal file system and continue to operate normally, while the underlying file system may actually be missing data blocks from multiple files. According to the techniques described herein, all input/output (I/O) requests for missing files are intercepted and blocked until the requested data is fetched from the CVD server. The interceptor logic is configured to process such interception of I/O requests completely transparently to the I/O requestors, which may include user-mode applications, kernel-mode drivers, and other OS components.

In some embodiments, the interceptor logic may also be configured to throttle the streaming agent service while the streaming set is being downloaded from the CVD server. For example, the interceptor logic may be configured to detect and determine the level of activity performed by the user on the endpoint device for example, by tracking keyboard activity, mouse activity, etc. If the interceptor logic determines that the user is active/working, in order not to slow down the user activity the interceptor logic throttles the background streaming by notifying the streaming agent service accordingly.

In some embodiments, while the endpoint device is operating offline (e.g., is disconnected from the data center), the interceptor logic is configured to cause all requests to missing files to fail as these requests cannot be served offline. In these cases, the interceptor logic returns to the file requestors a failure code with a standard code value, which indicates that the requested files are offline and which should be properly handled by the requestor applications.

Block-Level On-Demand Streaming

One approach to streaming file data involves fetching the entire file from the CVD server in response to a request from a user application on the endpoint computing device. According to this approach, all file open requests are blocked until the file is completely fetched from the CVD server; the pending requests are released only after all blocks of the file have been downloaded to the local disk on the endpoint device. This streaming approach, however, may be inefficient for large files which are only partially read by the requesting application or client on the endpoint device.

To address this issue, and in order to further reduce the time period in which a user is waiting for an on-demand request for a missing file to complete, according to the techniques described herein the interceptor logic is configured to reply to the requestor application after downloading a small subset of the file contents (e.g., a subset of all the blocks in the file). This technique is somewhat analogous to desktop streaming, except that it is applied to the blocks in a single file. In effect, this technique is a block-level on-demand streaming technique and it provides a useful capability when the accessed file is large and the access pattern to file is random-access, as opposed to sequential whole-file access in which an application first reads the entire file before starting to process it. Example of the former type of file is a file that stores e-mail messages (e.g., such as ".pst" files and other Microsoft Outlook files); examples of the latter type of files are other Microsoft Office application files (e.g., such as Microsoft Word files with ".doc" extensions). Accordingly, in some embodiments the block-level on-demand streaming may be configured on the endpoint device only for certain types of file and not configured for other types of files that are stored on the device.

To perform block-level streaming for files that are opened for read-write access, according to the techniques described herein the interceptor logic allows applications to open the file, regardless of the fact that file data may be missing. The interceptor logic then intercepts block-level read requests and blocks them until the desired block is fetched from the CVD server. The interceptor logic keeps a table of missing blocks per file and stops intercepting block-level access requests to files which have been completely fetched from the CVD server.

When applications are reading a file, the applications usually have some common block access patterns. For example, an application may serially read multiple consequent blocks or read several groups of blocks from several distinct parts of a file. However, the overhead of fetching these common blocks one-by-one is high as it is not efficient to perform multiple round-trips from the interceptor logic to the streaming agent service (within the endpoint device) and eventually through the network to the CVD server for each accessed block. Thus, in order to reduce this overhead, in some embodiments the interceptor logic is configured to track file block access patterns, so that it can predict which blocks will probably be required per-file. According to this tracking mechanism, the interceptor logic collects block access statistics per-file, and then uses these statistics to predict which blocks will be required on the next block access based on one or more heuristics.

Figure 5:
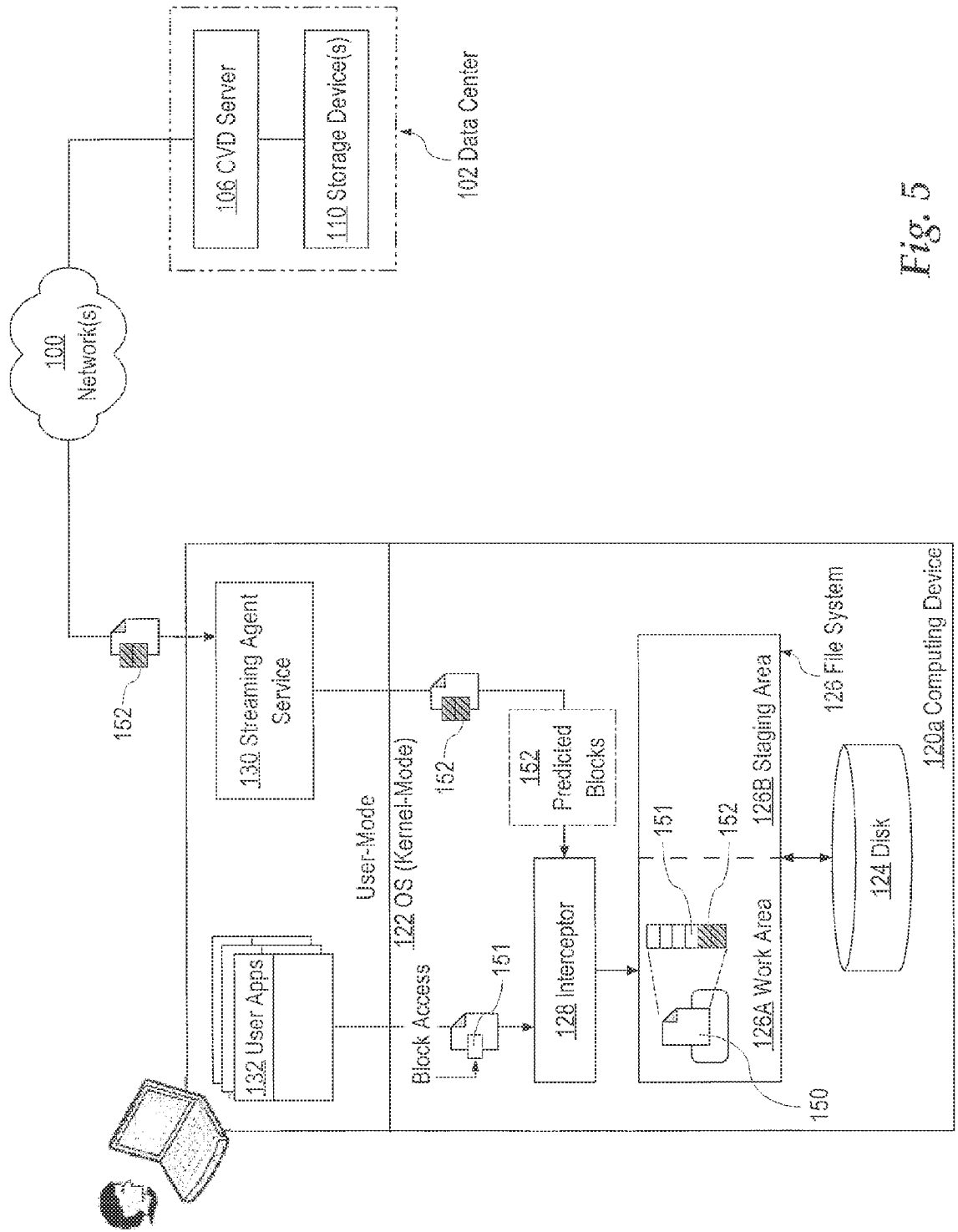
FIG. 5 is a block diagram that illustrates a block-level on-demand streaming according to an example embodiment.

For example, some embodiments may use a heuristic that is to track the most frequently accessed blocks per-file and/or per-application. FIG. 5 is a block diagram that illustrates an example block-level on-demand streaming according to one such embodiment. In FIG. 5, block-level on-demand streaming using a frequently-accessed heuristic is described with respect to computing device 120a in the operational context illustrated in FIGS. 1A-1B. In that operational context, computing device 120a is configured to connect to data center 102 over network(s) 100, where CVD server 106 in data center 102 is configured to store and manage on storage device(s) 110 one or more desktop images for the computing device. Computing device 120a comprises one or more processors, one or more volatile memory devices, and one or more persistent storage devices such as, for example, disk 124. Computing device 120a executes interceptor logic 128 in the kernel-mode of OS 122, while streaming agent service 130 is executed in user-mode on top of OS 122.

Referring to FIG. 5, in operation a user application 132 opens file 150 for read and/or write access, where file 150 is stored in work area 126A of file system 126 but one or more blocks of the file have not yet been downloaded from CVD server 106. After file 150 is opened, interceptor logic 128 intercepts a block-level request from a user application 132 to access block 151 in file 150. Interceptor logic 128 blocks the intercepted request, and then accesses the block-access statistics that have been previously collected for file 150. Based on the collected statistics, interceptor logic 128 determines that one or more blocks 152 of file 150 are not yet downloaded from CVD server 106 but are frequently accessed and thus are likely to be requested by user application 132 immediately (or very soon after) the request for block 151. In response to this prediction, interceptor logic 128 blocks the request from user application 132, and notifies streaming agent service 130 to fetch the predicted blocks 152 along with block 151. Streaming agent service 130 then fetches, from CVD server 106, both block 151 and the predicted blocks 152. After block 151 and predicted blocks 152 are fetched and stored in file 150, interceptor logic 128 unblocks the request from user application 132, and the user application proceeds to access the requested block 151.

In this manner, the technique for block-level on-demand streaming provides a significant boost in block-level streaming performance because the overhead caused by repeated application requests for file blocks of the same file is greatly reduced or outright eliminated.

Handling Concurrency Control Conflicts. One technology challenge with implementing desktop streaming while the files are accessed by applications is to overcome file system concurrency control semantics. For example, if process P1 opens file F1 with a sharing mode that precludes access by other processes, then the streaming process, SP, would also be blocked by the file system, thereby creating a deadlock since P1 is waiting for SP to stream missing data, but SP is blocked by P1 due to a sharing mode violation. Similarly, if P1 is granted a byte range lock on a file segment from a file block that is missing, then SP will not be able to write into the missing areas that are locked by P1.

To address this problem, according to the techniques described herein the interceptor logic changes the original open share mode issued by process P1 to full maximum sharing (e.g., to a share mode that allows other processes to open the file for read and write operations), which enables the streaming process SP to open the file and write into the missing areas in the file. However, when another process, P2, attempts to access the file, the interceptor logic enforces the file system sharing semantics by checking for compatibility between P2's requested sharing mode, and the original sharing mode requested by P1. If incompatible, P2s request is denied by the interceptor logic, before reaching the file system. Otherwise, the request is granted and P2's sharing mode is again converted to the full sharing mode on the actual file system. Thus, in effect, the interceptor logic implements and enforces the file sharing semantics as a layer over the file system, and makes the file system fully shareable.

With regards to byte-range locks, the techniques described herein provide two mechanisms for handling requests for such byte-range locks. In cases where byte-range lock requests are infrequent, the interceptor logic precedes the file system lock request by injecting an artificial read request for the requested byte-range—this ensures that the file block including the byte-range data is streamed into and stored on the endpoint device before the byte-range lock is requested at the file system level, thereby and preventing locking conflicts. This solution avoids the need to add a layer of concurrency control logic in the interceptor logic for locks in addition to the logic for open sharing modes.

It is noted that the above mechanism might affect the user experience in cases where the lock requests are frequent and/or span large byte ranges. In the worst case scenario, if the open request is followed by a lock request for the entire file, the requesting process would have to wait until the whole file is streamed before making progress, thus slowing down the response time to the user. Thus, in cases where lock requests are frequent and involve large ranges, a mechanism is provided in the interceptor logic that implements locking semantics on top of the file system in a similar manner as the handling of file open sharing mode. That is, a lock request by a process P1 is maintained at the layer of the interceptor logic and is not propagated down to the file system, so that the streaming process SP is unaffected by the locking but any other process, P2, that attempts to access the byte-range is blocked by the interceptor logic without being propagated to the file system.

Offline Support

The techniques for desktop streaming described herein allow an endpoint computing device to operate also when the user works offline, which is a common use case for laptop users. When the endpoint device is offline (e.g., is disconnected from the data center), there is no way to fetch a missing file on-demand. In this case, the interceptor logic is configured to turn on the offline-bit attribute of missing files. The offline bit of a file indicates to the applications and clients on the endpoint device that the file is "offline", and properly behaved applications should know how to handle it. In addition, in some embodiments that are implemented on a Windows OS, the Windows Explorer application indicates files with offline bit with a special marker which informs the users that the file is offline. If an application insists on trying to open an offline file, the OS on the endpoint device returns a message to the application that indicates that the file is not locally available (e.g., in a Windows OS such message would be a "STATUS_FILE_IS_OFFLINE" message). Most user applications are configured to handle this error code and will display an appropriate message indicating that "the remote storage service was not able to recall the file".

3.4 Atomic Switching of Images (the Pivot)

According to the techniques for desktop streaming described herein, an endpoint computing device that needs to download a new desktop image can be in one of two states. In the first state, the endpoint device is capable of downloading the new desktop image. Typical cases for this first state arise when a new hardware contains a vanilla OS image, or an image that needs to be replaced but is still able to connect to the network and download the prefetch set. In the first case, once the endpoint device has downloaded the prefetch set onto the staging area, the pivot application is executed to atomically replace the previous image with the new image and let the device boot from the new image. In the second state, there is no image at the endpoint device that can execute the download of the prefetch set, in which case the device needs to boot over the network, download and execute a mini-client that is configured to fetch the files in the prefetch set from the CVD server, and then apply the image with the downloaded prefetch set.

Overview

One of the challenges of desktop streaming is to be able to replace all OS components in a manner which is as OS-transparent as possible. One of the implications of this transparency is that OS components need to be replaced in a consistent/transactional manner. Thus, the OS should not be in an intermediate state in which only part of the files have been replaced, as this may cause inter-file inconsistencies and OS failures.

To address these issues, the techniques for desktop streaming described herein may replace in an atomic manner various types of files including, but not limited to, application files, kernel components (e.g., drivers), OS configuration files (e.g., Windows OS registry files), and all metadata related to or associated with the replaced files such as, for example, Access Control Lists (ACLs), attributes, timestamps, and short filenames.

In some embodiments, the techniques described herein are implemented for endpoint devices that execute a Windows OS. A Windows OS, however, does not provide a built-in mechanism to perform an atomic switch of a current image that is executing on an endpoint device with a new desktop image. Thus, in these embodiments an endpoint device is provisioned with a native, user-mode application that is referred to herein as a "pivot application". The pivot application may be implemented as a native application that uses a native API to trap into the kernel of the OS, which allows the pivot application to be started very early into the boot-up process and to be the only application running when it copies and moves files in the file system. This ensures that other processes will not be accessing or locking the files in the file system while the pivot application is running. The pivot application is configured to execute on the endpoint device during the very early boot stages and to perform an atomic switch operation that replaces a current image with a new (partially downloaded) image for the endpoint device followed by a reboot from the files in the new image. When downloaded to the endpoint device, the new desktop image represents a complete view of the file system, but includes only the files in the prefetch set; files other than the files in the prefetch set (e.g., such as the files in the streaming set or the leave-behind set) are represented in the new desktop image as file metadata (e.g., such as file identifiers or file stubs) but the actual data of these files is not included in the new desktop image that is initially downloaded to the endpoint device.

For example, in these embodiments the pivot application is launched during the early phases of the Windows OS boot while there are no other applications and/or services running. The pivot application moves all the associated files from a staging area (which was prepared in the pre-boot download phase to store the files in the prefetch set of the new desktop image) into the target file system paths, and fixes all the metadata associated with new files. If sudden power failures occur on the endpoint device while the pivot application is in the process of switching the current image with the files from the prefetch set, the pivot application is configured to retry performing the atomic file replacement until successful completion. Once the atomic switch is completed and all necessary file metadata modifications have been successfully performed, the pivot application terminates the current boot and invokes a second boot up of the endpoint device. In the new boot up, the Windows OS starts up from the files of the prefetch set, which represents a completely consistent view of the newly restored desktop image.

The Modified Boot Sequence

In some embodiments, the pivot application is implemented as an application that is invoked early in the boot sequence by a boot component (e.g., in the case of a Windows OS it would be the session manager) of the OS. No OS files or configuration database entries are moved before the endpoint device is booted up the first time, which means that upon the first boot a fully old OS image is initially loaded. Running at a very early boot stage, the pivot application has the advantage that the whole hard disk is available and no files are locked at this point and no handles to files exist. This allows the pivot application to replace the configuration database entries and all the files included in the prefetch set by using regular file move operations. Once all necessary files are moved into the target file system paths, the pivot application causes the endpoint device to perform a second boot before the OS configuration database is loaded and anything else happens. Upon the second boot, a fully new OS image is loaded as the second boot is effectively performed from the files included in the downloaded prefetch set.

Details of the Boot Sequence. According to the techniques described herein, the boot process on an endpoint computing device is modified to implement the atomic switch of a current or old image with a new desktop image. For the purpose of updating files following a streaming operation that downloads the prefetch set of the new desktop image to the endpoint device, the pivot application performs an atomic file switch during which the following flow occurs:

The endpoint device requires a boot up in order to perform file/directory updates/deletions. For example, at the end of the streaming phase a user of the device may be prompted to reboot.

When the endpoint device is booted up, the pivot application is executed during the boot in order to perform the atomic switch, where the pivot application is executed early during the boot sequence (e.g., in case of a Windows OS, before the OS session manager performs its own pending operations).

The pivot application performs the atomic switch by moving files from the staging area (e.g., files in the prefetch set stored therein) into the target working file system paths, by overwriting files in the target system paths, and by deleting files from the target file system paths and/or from the staging area. When needed, the pivot application can grant itself system privileges in order to gain access to restricted files that it needs to manipulate.

When the pivot application is done, it terminates the boot and invokes a second boot of the endpoint device.

If any operations to move a file or a directory (with its children objects) need to be performed as part of switching the current image with the new desktop image, such operations are performed during the second boot up of the endpoint device. An example of such operation is the execution of the MoveFileEx function in a Windows OS.

3.5 Boot Over WAN

There are certain use cases in which image switching on an endpoint device is not possible, and a complete boot over the network (e.g., a WAN) needs to take place. Examples of such use cases include:

Fixing corrupted OS. The OS on the endpoint device is corrupted to the point where the device cannot start and/or cannot start the streaming client to download the prefetch set of the new image. For example, in embodiments implemented on endpoint devices that run a Windows OS, a registry hive may be corrupted or the Hardware Abstraction Layer (HAL) DLL may have been deleted.

Restoring to a blank system. The endpoint device has no previous image on it but only has an empty disk. This is actually quite common with virtual machines, but might also occur in physical machines.

Booting Over the Network

Starting from the endpoint device's BIOS, the procedure of booting the device over a network such as a WAN may be as follows:

- The endpoint device is assigned an Internet Protocol (IP) address by a Dynamic Host Configuration Protocol (DHCP) server.
- The endpoint device receives the IP address of a pre-execution environment (PXE) server from the DHCP server.
- The endpoint device downloads from the PXE server a miniature generic OS kernel and a basic file system that includes the files for the applications used during the rest of the boot-over-the-network process. The miniature generic OS kernel includes a mini-client that is operable to download files from the CVD server and network optimization modules.
- The endpoint device is booted from the miniature generic OS kernel, and the mini-client is executed to initiate the restore operation of desktop image on the endpoint device. When executed, the mini-client performs some or all of the following:
  - authenticates the user of the computing device, and sends a request to the CVD server to look up the matching desktop image in the CVD repository;
  - gathers, and sends to the CVD server, hardware information about the endpoint device in order to guide the CVD server as for the content of the desktop image to be delivered to the device, or alternatively provides an interface to the user and receives user input that selects the image content;
  - sends a request to the CVD server and downloads the prefetch set.
- The download of the prefetch set is performed in a WAN-optimized manner by using the network optimization modules, which take advantage of existing local files, if any, as well as compress and de-duplicate the files in the prefetch set.
- After the prefetch set is downloaded, the mini-client (or another component on the endpoint device) causes the endpoint device to reboot from the files in the prefetch set. After the endpoint device reboots from the files in the prefetch set, the download of the files in the streaming set of the desktop image is commenced in the background.

3.6 Network Optimizations for Desktop Streaming

According to the techniques described herein, in some embodiments network optimizations may be used in the desktop streaming process. Before starting the prefetch phase, a streaming client on an endpoint device invokes a scan operation to traverse the local file system and to generate and store a de-duplication index of file and file-chunk signatures at least for the files that are expected to be included in the prefetch set and the streaming set. For example, the de-duplication index may include file-level signatures that identify entire files and chunk-level signatures that identify unique chunks (or portions) from the files. The de-duplication index is used during the process of downloading a desktop image to de-duplicate any files or file chunks from the desktop image that already exist at the endpoint device. For example, when downloading files from the desktop image, the de-duplication index may be used to determine and transfer only the file-level signatures of those files that are already stored on the endpoint device, but not any data from those files, and to transfer only the chunk-level signatures of those chunks that are already stored on the endpoint device, but not any data from those chunks. The de-duplication index may be used throughout the streaming procedure, including the prefetch and streaming phases.

Examples of some network optimization mechanisms that may be used in conjunction with the techniques for desktop streaming described herein are described in U.S. patent application Ser. No. 12/578,485, filed by Israel Ben-Shaul et al. on Oct. 13, 2009 and titled "STORAGE-NETWORK DE-DUPLICATION", the entire content of which is hereby incorporated by reference as if fully set forth herein.

Read-Ahead On-Demand Streaming

In some embodiments, in addition to on-demand support for fetching a missing file during streaming, the interceptor logic in an endpoint device is configured not wait for a client application on the device to request missing file blocks. Instead, the interceptor logic proactively requests (or causes the request of) missing blocks from the file in anticipation of future requests by the client application. Further, for certain files, the interceptor logic is configured to prefetch (or cause the prefetching of) files that are related to a currently requested file. For example, when requesting an application executable file, regardless of whether the executable file is already at the endpoint device or is still missing, the interceptor logic identifies the set of dynamic link library (DLL) files that are associated with that application and re-prioritizes these DLL files at the top of the list of files in the streaming set.

On-Demand Driver Store

Using the techniques for desktop streaming described herein, it is possible to create and maintain a desktop image containing a huge store of device drivers for the corresponding endpoint device without having to download to the device the entire store upon an operation to restore the desktop image onto the device.

In some embodiments, this functionality can be implemented by using the leave-behind set as follows. The desktop image in the data center includes all device drivers for the endpoint device, but only the device drivers' metadata files (e.g. such as ".inf" files) are pre-fetched to the device. The rest of the device driver files (e.g. such as ".sys" files) are assigned to the leave-behind set and are thus only downloaded to the endpoint device if they are explicitly requested by the OS executing on the device. Using this mechanism, an OS (e.g., such as Windows) should be able to find the best matching plug-and-play device drivers by scanning the configuration ".inf" files. When the OS decides that it would like to install a specific device driver, it will attempt to access that driver's ".sys" file(s) thereby causing an on-demand download for the ".sys" file(s). Thus, this mechanism allows the creation of a universal driver store without the overhead of downloading all device drivers in the store upon each operation to restore an image onto the endpoint device. If the OS does not require a specific driver to operate, this driver would never be downloaded to the endpoint device, which saves network bandwidth while at the same time keeping the flexibility of having a universal driver store.

In some embodiments, some device drivers (e.g., such as device drivers that are used for booting and network access) are included the prefetch set—otherwise the endpoint device may not be able to boot or will be able to boot but will not be able to fetch the files included in the streaming set for the device.

3.7 Supporting Heterogeneous Hardware

As discussed above, one of the benefits of the techniques for desktop streaming described herein is that they allow support for a bare-metal image and heterogeneous hardware types of endpoint computing devices. This functionality implies that the desktop image for a given endpoint device may need to be adapted to a new endpoint device if the previous device, to which the desktop image was bound, has a different hardware than the new device. To address this challenge, the techniques described herein provide two complementary mechanisms that can be employed by an endpoint device, as explained hereinafter. Regardless of the mechanism used to resolve hardware differences, the endpoint device leverages its knowledge of the target (new) hardware configuration, which is sent to the CVD server as part of the communication protocol between the endpoint device and the CVD server and is recorded by the CVD server in the CVD repository in association with the corresponding desktop image. Based on this hardware configuration information, the CVD server can decide what mechanism to use to resolve the hardware differences when restoring the desktop image onto a new endpoint device with different hardware.

In some embodiments, the CVD server determines the hardware type of the target (new) endpoint device from the request for the desktop image received from the device. The CVD server then compares the received hardware type to the previous hardware type on which the desktop image was last executed, where the previous hardware type is stored in the data center as hardware configuration information associated with the desktop image. The CVD server then decides whether the stored desktop image is compatible with the new endpoint device or not. If the desktop image is not compatible with the hardware of the new endpoint device, the CVD server performs a "rebase" operation, which effectively switches the base-image portion of the desktop image to match the hardware needs of the new endpoint device. User data, user-installed applications, and other user environment and configurations are kept intact in the stored desktop image.

Multi-Client Image

One of the mechanisms for resolving hardware differences when restoring a desktop image onto new hardware involves generation and storing of a multi-client image. This mechanism is applicable if both the previous and new endpoint devices that are bound to a given desktop image can be served from the same base-image portion of the given desktop image. This mechanism may be implemented by building the base-image to support multiple client types. In order to build such a multi-client image, the device drivers (necessary to support the multiple client types) and their corresponding OS configuration entries are added to the base-image portion of the desktop image. Examples of such device drivers include, without limitation, both critical device drivers (e.g., such as disk controllers) and plug-and-play (PnP) drivers (e.g. such as network and display drivers). Once such a multi-client image is built, the desktop image can be safely restored in accordance with the techniques described herein onto all devices that have a hardware type that is supported by the multi-client image.

Rebase Operation (Dynamic Switching of Base-Image Portions)

Some operational scenarios for restoring a desktop image onto an endpoint device involve hardware replacement. For example, a user may lose her laptop or may receive a laptop of an upgraded model. In these cases, it is desirable to allow the user to continue to work on the new laptop as quickly as possible, while keeping the user's existing desktop image with all of the user-specific applications, configurations, settings, and other user-specific data.

However, a straightforward restore operation of the user's desktop image onto a new laptop (which could be of a completely different hardware model) may result in blue screens on boot or in malfunctioning devices and services if the new laptop does boot from the desktop image. For example, in embodiments that are implemented for endpoint devices that run a Windows OS, this scenario may happen because under the Windows OS moving a hard drive from one machine to another may lead to blue screens or other device malfunctions, as the Windows OS may be missing device drivers and registry entries which are required by the new hardware. One possible solution to this problem is to ensure that the desktop image contains the device drivers for both the previous and the new hardware models. However, creating such a multi-device "golden" image is a very difficult task and may not even be possible in some scenarios.

To address these challenges, the techniques described herein provide rebase logic for merging user data and applications, which are stored in an existing desktop image in a data center, with the device drivers and hardware-related applications corresponding to the hardware of the new endpoint device onto which the desktop image needs to be restored. This allows the user to take full advantage of the hardware of the new endpoint device, while at the same time continuing to use the existing user-specific environment.

According to the techniques described herein, to provide better flexibility in some embodiments a CVD server is configured with logic for implementing a "rebase" operation. As used herein, "rebase operation" refers to a restore operation of a desktop image onto an endpoint device which also includes a change of the base-image portion of desktop image. The base-image portion of the desktop image includes all device drivers, applications, configurations, and other types of files that need to match the hardware of a target device in order to ensure the proper operation of the device. For example, suppose that a laptop computer is executing from a desktop image with a base-image portion which corresponds to this specific laptop computer and which includes the matching hardware-specific drivers, applications, and configurations. When this desktop image is restored onto a new laptop computer having a different hardware, according to the techniques described herein the base-image portion of the desktop image is automatically replaced with a new base-image portion (which includes hardware-specific drivers, applications, and configurations) that corresponds to and matches the new laptop's hardware.

The combined operation of restore and base-image replace on a desktop image needs to be performed atomically as the desktop image cannot be restored into the new hardware before the base-image portion is updated (or otherwise the device having the new hardware may not boot). Therefore, according to the techniques described herein the rebase logic performs the restore and base-image update operations together, requiring a single boot of the target endpoint device to switch it to the desktop image with the new base-image portion.

In some embodiments, the rebase operation is implemented by rebase logic in the CVD server that is configured to perform a desktop image restore combined with the capability to update the base-image portion of the desktop image. To perform a rebase operation, the rebase logic performs a calculation that receives as input several parameters such as, for example, the machine identifier of the new target device, the machine identifier currently associated with the stored desktop image, and the previous base-image portion of the stored desktop image. This calculation takes into consideration the previous and the new endpoint devices' file systems and configuration files (e.g., such as registry hives).

To generate the new, updated base-image portion of the stored desktop image, in some embodiments the rebase logic first determines whether the hardware type associated with the stored desktop image is compatible with the hardware type that is indicated in the request for the desktop image received from a new target endpoint device. If the new hardware type is not compatible with the hardware type associated with the stored desktop image, the rebase logic generates a rebased desktop image by modifying the base-image portion of the desktop image to include a modified set of files that matches the hardware type of the new hardware device. After the rebased desktop image is generated in this manner, a restore operation for the rebased desktop image is performed in accordance with the techniques described herein. For example, the CVD server segments the rebased desktop image into a prefetch set, a streaming set, and a leave-behind set by assigning each file in the rebased desktop image to one of a prefetch set, a streaming set, and a leave-behind set, and then sends the prefetch set to the target device followed by the streaming set.

To make possible the merging of user data/applications with the device drivers and hardware-related applications for a new endpoint device, the rebase logic is configured to clean up the base-image portion of a desktop image from any machine-specific data. For example:
- the name of the reference device from which the base-image portion was captured must not override the name of the new target device;
- identifiers of specific device instances available in the reference device should not be transferred along with the updated base-image portion;
- user profiles which exist in the reference device should not be delivered as part of the updated base-image portion.

Additionally, the techniques described herein ensure that both critical and PnP device drivers are automatically and properly installed on the target endpoint device after the rebase operation, without requiring an IT administrator to specially prepare the base-image portion of the desktop image. Examples of mechanisms that are employed to achieve this functionality include, without limitation:
- The streaming client on the target endpoint device and/or the CVD server ensure that after the rebase operation, the OS will have all the device driver configuration files (e.g., such as ".inf" files) which are available in the new base-image portion. (In embodiments for endpoint devices that execute a Windows OS, such files are required to allow the Windows OS to perform PnP driver installation). The device driver configuration files are captured from the reference device and stored in a specifically-designated directory on the target endpoint device, where the OS on the target device is instructed to look for device drivers. On the boot following the rebase operation on the target device, the OS automatically looks for device drivers for PnP devices. The OS will find the configuration files for the required drivers in the specifically-designated directory and will install any missing device drivers.
- In embodiments for endpoint devices that execute a Windows OS, the streaming client (or another component) on the target endpoint device is configured to force the Windows OS to update the existing device drivers with newer versions if such newer versions were delivered through the new, updated base-image portion. This is performed by automatically "tickling" the Windows OS to re-detect a more compatible driver. This mechanism is needed as a Windows OS does not automatically look for a better matching driver after the base-image portion is updated.
- The streaming client (or another component) on the target endpoint device ensures that after the rebase operation, the OS will be able to boot properly by downloading the required critical device drivers (e.g., such as disk controller drivers). For example, in embodiments for endpoint devices that execute a Windows OS, the streaming client (or another component) on the target device checks the files in the new base-image portion (e.g., the relevant files in the prefetch set) to determine whether any critical device driver files are missing, and prevents the performance of the rebase operation if such files are missing because otherwise the rebase operation will lead to the infamous inaccessible boot volume blue screen.
- The streaming client (or another component) on the target endpoint device automatically invokes installation of added network components and uninstallation of removed network components. Examples of such network components include, without limitation, network protocols, network services, and network clients. This functionality is useful since in some embodiments some network components which are required for proper operation of the target device are not detected and installed automatically via the standard plug-and-play mechanisms.

Depending upon a particular implementation, the techniques for desktop streaming described herein may be implemented in any context and on any kind of computing platform or architecture, and are not limited to any particular context, computing platform, or architecture. For purposes of explanation, FIG. 6 is a block diagram that illustrates an example computer system 600 upon which embodiments of the techniques described herein may be implemented. For example, computer system 600 may be used to implement the functionalities of a CVD server and of other server-side components in accordance with the techniques described herein. In another example, computer system 600 may be used to implement the functionalities of an endpoint computing device and of the endpoint-side components in accordance with the techniques described herein.

According to one embodiment, the techniques for desktop streaming described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. Thus, in various embodiments, any or all of the endpoint device, CVD server, streaming agent service, interceptor logic, pivot application, and other server-side and endpoint-side components configured to perform the functionalities of the techniques for desktop streaming described herein may comprise such special-purpose computing devices, alone or in combination with other elements.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is

1. A method for replacing a current desktop image having a current operating system on local storage media for a computing device, the method comprising:
   executing an agent process on the computing device for downloading, from a centralized virtual desktop (CVD) server to a staging area on the local storage media, a replacement desktop disk image including a prefetch set of files and metadata for additional files, the prefetch set of files including a minimal set of files necessary to boot a replacement operating system, the replacement desktop disk image not including contents of the additional files;
   rebooting the computing device to launch a pivot application configured to replace a current disk image with the replacement desktop disk image downloaded to the staging area by the agent process, the pivot application being a sole executing process on the computing device during the replacing; and
   rebooting the computing device to load the replacement operating system using the prefetch set of files, the prefetch set of files including interceptor logic and a streaming agent, the interceptor logic being configured to:
   intercept a request to access a first file;
   determine that the first file is one of the additional files that do not presently include content on the local storage media;
   block the request to access the first file based on the determination that the first file is one of the additional files that do not presently include content on the local storage media;
   request that the streaming agent retrieves the first file from the CVD server; and
   enable the request to access the first file to proceed when the first file is retrieved and written to the local storage media.

2. The method of claim 1, wherein the additional files include a streaming set of files, the streaming agent being further configured to download remaining files of the streaming set of files whether or not specifically requested.

3. The method of claim 2, wherein the streaming agent downloads the streaming set in a background process and handles requests for access to files not currently present on the local storage media with priority over the downloads of other files of the streaming set that are not specifically requested.

4. The method of claim 2, wherein the additional files further include a leave-behind set, the streaming agent being configured to download a second file from the leave-behind set only when a request to access the second file is received by the interceptor logic.

5. The method of claim 1, wherein the pivot logic is further configured, in response to a power failure during the execution of the pivot process, to retry replacing a current set of files with a new desktop image until successful completion.

6. The method of claim 1, wherein the pivot application is configured to execute in a user-mode memory address space, the pivot application accessing OS privileges to access files designated as restricted by the current operating system.

7. The method of claim 1, further comprising:
   prior to the downloading of the replacement desktop disk image to the staging area, determining whether the local storage media has sufficient capacity to store the replacement desktop disk image;
   when the determination is made that the local storage media lacks sufficient capacity to store the replacement desktop disk image, identifying files of the current desktop image for eviction and removing the identified files from the current disk image, the files being identified for eviction being collectively of sufficient size to provide available capacity on the local storage media for the replacement desktop disk image.

8. The method of claim 1, wherein the interceptor logic is further configured to collect information related to file usage throughout an operation of the computing device and send the file usage information to the CVD server to improve identification of files for inclusion in the prefetch set of files.

9. A non-transitory computer-readable storage medium for replacing a current desktop image having a current operating system on a local storage medium for a computing device, the non-transitory computer-readable storage medium having code thereon that when executed by a processor, causes the processor to:
   execute an agent process on the computing device for downloading from a centralized virtual desktop (CVD) server to a staging area on the local storage medium, a replacement desktop disk image including a prefetch set of files and metadata for additional files, the prefetch set of files including a minimal set of files necessary to boot a replacement operating system, the replacement desktop disk image not including contents of the additional files;
   reboot the computing device to launch a pivot application configured to replace a current set of files in the file system belonging to a current disk image with the replacement desktop disk image downloaded to the staging area by the agent process, the pivot application being a sole executing process on the computing device during the replacing; and
   reboot the computing device to load the replacement operating system using the prefetch set of files, the prefetch set of files including interceptor logic and a streaming agent, the interceptor logic being configured to:
   intercept a request to access a first file:
   determine that the first file is one of the additional files that do not presently include content on the local storage medium;
   block the request to access the first file based on the determination that the first file is one of the additional files that do not presently include content on the local storage medium;
   request that the streaming agent retrieves the first file from the CVD server; and enable the request to access the first file to proceed when the first file is retrieved and written to the local storage medium.

10. The non-transitory computer-readable storage medium of claim 9, wherein the additional files include a streaming set of files, the streaming agent being further configured to download remaining files of the streaming set of files whether or not specifically requested.

11. The non-transitory computer-readable storage medium of claim 10, wherein the streaming agent downloads the streaming set in a background process and handles requests for access to files not currently present on the local storage medium with priority over the downloads of other files of the streaming set that are not specifically requested.

12. The non-transitory computer-readable storage medium of claim 10, wherein the additional files further include a leave-behind set, the streaming agent being configured to download a second file from the leave-behind set only when a request to access the second file is received by the interceptor logic.

13. The non-transitory computer-readable storage medium of claim 9, wherein the pivot logic is further configured, in response to a power failure during the execution of the pivot process, to retry replacing the current set of files with a new desktop image until successful completion.

14. The non-transitory computer-readable storage medium of claim 9, wherein the pivot application is configured to execute in a user-mode memory address space, the pivot application accessing OS privileges to access files designated as restricted by the current operating system.

15. The non-transitory computer-readable storage medium of claim 9, wherein the method further comprises:
prior to the downloading of the replacement desktop image to the staging area, determining whether the local storage medium has sufficient capacity to store the replacement desktop disk image;
when the determination is made that the local storage medium lacks sufficient capacity to store the replacement desktop disk image, identifying files of the current desktop image for eviction and removing the identified files from the current disk image, the files being identified for eviction being collectively of sufficient size to provide available capacity on the local storage medium for the replacement desktop disk image.

16. The non-transitory computer-readable storage medium of claim 9, wherein the interceptor logic is further configured to collect information related to file usage throughout an operation of the computing device and send the file usage information to the CVD server to improve identification of files for inclusion in the prefetch set of files.

17. A system comprising:
a centralized virtual desktop (CVD) server; and
a computing device comprising:
a memory comprising a staging area; and
a processor programmed to:
execute an agent process on the computing device for downloading, from the CVD server to the staging area, a replacement desktop disk image including a prefetch set of files and metadata for additional files, the prefetch set of files including a minimal set of files necessary to boot a replacement operating system;
rebooting the computing device to launch a pivot application configured to replace a current disk image with the replacement desktop disk image downloaded to the staging area by the agent process, the pivot application being a sole executing process on the computing device during the replacing; and
rebooting the computing device to load the replacement operating system using the prefetch set of files, the prefetch set of files including interceptor logic and a streaming agent, the interceptor logic being configured to:
intercept a request to access a first file;
determine that the first file is one of the additional files that do not presently include content on the memory;
block the request to access the first file based on the determination that the first file is one of the additional files that do not presently include content on the memory;
request that the streaming agent retrieves the first file from the CVD server; and
enable the request to access the first file to proceed when the first file is retrieved and written to the memory.

18. The system of claim 17, wherein the additional files include a streaming set of files, the streaming agent being further configured to download remaining files of the streaming set of files whether or not specifically requested.

19. The system of claim 18, wherein the streaming agent downloads the streaming set in a background process and handles requests to access files not present on the memory with priority over the downloads of other files of the streaming set that are not specifically requested.

20. The system of claim 18, wherein the additional files further include a leave-behind set, the streaming agent being configured to download a second file from the leave-behind set only when a request to access the second file is received by the interceptor logic.

* * * * *